(12) United States Patent
George et al.

(10) Patent No.: US 10,171,858 B2
(45) Date of Patent: Jan. 1, 2019

(54) UTILIZING BIOMETRIC DATA TO ENHANCE VIRTUAL REALITY CONTENT AND USER RESPONSE

(71) Applicant: Adobe Systems Incorporated, San Jose, CA (US)

(72) Inventors: William George, Pleasant Grove, UT (US); Kevin Smith, Lehi, UT (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 3 days.

(21) Appl. No.: 15/448,110

(22) Filed: Mar. 2, 2017

(65) Prior Publication Data

US 2018/0255335 A1    Sep. 6, 2018

(51) Int. Cl.
| | | |
|---|---|---|
| H04N 21/25 | (2011.01) | |
| H04N 21/258 | (2011.01) | |
| H04N 21/45 | (2011.01) | |
| H04N 21/442 | (2011.01) | |
| H04N 21/81 | (2011.01) | |
| H04N 21/466 | (2011.01) | |

(52) U.S. Cl.
CPC ..... *H04N 21/25891* (2013.01); *H04N 21/251* (2013.01); *H04N 21/44218* (2013.01); *H04N 21/4532* (2013.01); *H04N 21/4665* (2013.01); *H04N 21/816* (2013.01)

(58) Field of Classification Search
CPC ....... H04N 21/25891; H04N 21/42201; H04N 21/251; H04N 21/4532; H04N 21/4665; H04N 21/816; H04N 21/44218; H04N 21/4415; G06T 19/003; G06T 2200/04; G06F 3/013; G06F 3/012; G06F 3/011; G06F 2203/011; A61B 5/744; H04W 8/18; H04L 67/306
USPC .......................................................... 725/12
See application file for complete search history.

(56) References Cited

U.S. PATENT DOCUMENTS

| | | | | |
|---|---|---|---|---|
| 2007/0033634 | A1* | 2/2007 | Leurs ..................... | H04N 7/163 725/143 |
| 2014/0316192 | A1* | 10/2014 | de Zambotti ......... | A61M 21/02 600/28 |
| 2016/0015307 | A1* | 1/2016 | Kothuri .................. | A61B 5/167 702/19 |
| 2016/0381415 | A1* | 12/2016 | Vijay ............... | H04N 21/44218 725/12 |

* cited by examiner

*Primary Examiner* — Nathan J Flynn
*Assistant Examiner* — Cynthia M Fogg
(74) *Attorney, Agent, or Firm* — Keller Jolley Preece

(57) ABSTRACT

The present disclosure includes methods and systems for providing virtual reality content based on user biometric data. In particular, the disclosed systems and methods can modify virtual reality content to elicit target user responses and/or target user actions. Specifically, the disclosed systems and methods generate biometric response thresholds and determine user responses by comparing biometric data with the biometric response thresholds. The disclosed systems and methods select virtual reality content based on the user response to drive the user toward a particular target user response and/or target user action. The disclosed systems and methods also tailor virtual reality content to individual characteristics of the user. For example, the disclosed systems and methods select virtual reality content based on baseline biometric characteristics and corresponding response categories of a user.

20 Claims, 15 Drawing Sheets

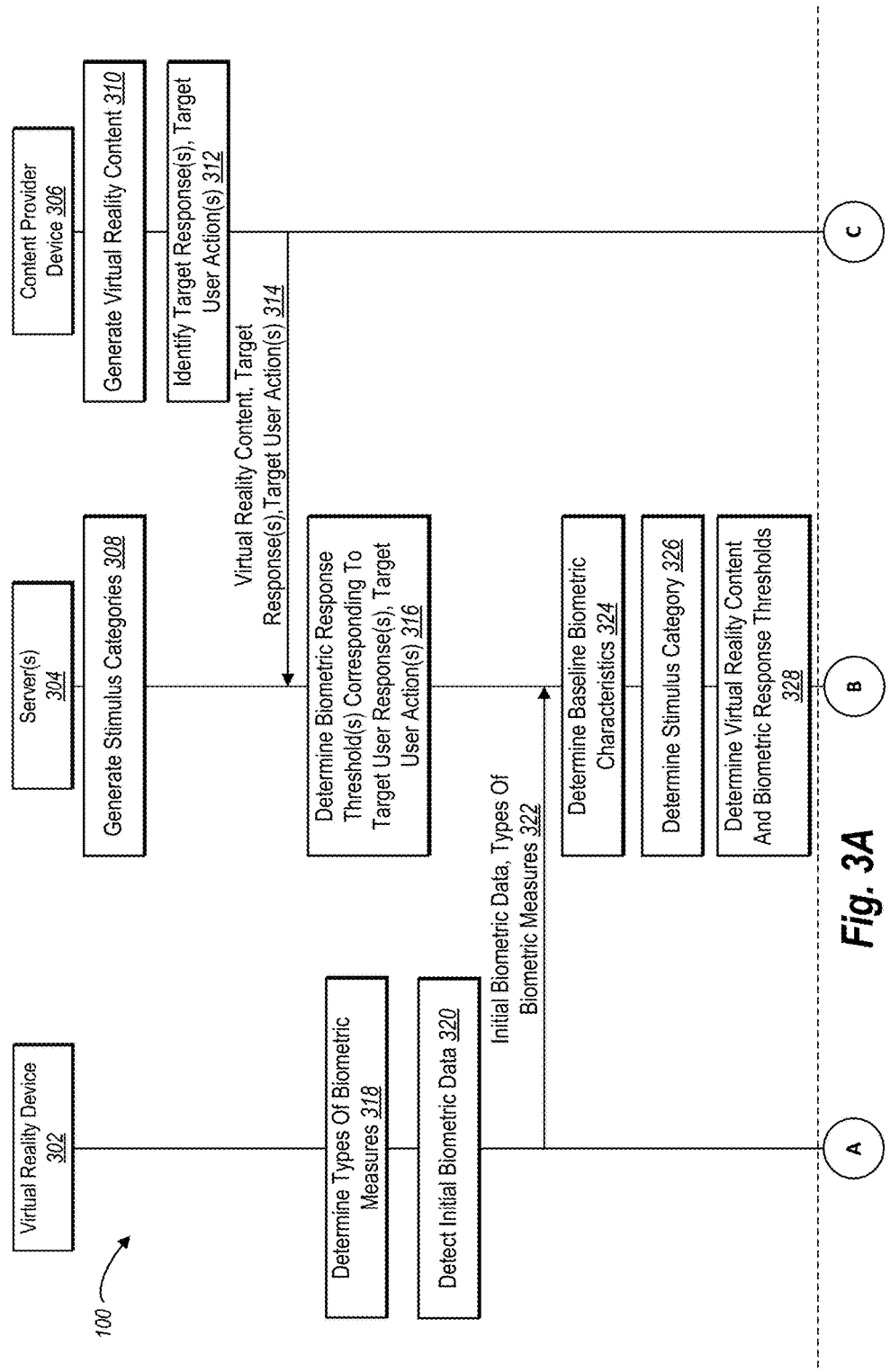

| Target User Response | Modifications |
|---|---|
| Increase Intensity | • Increase Volume<br>• Speed Up Virtual Reality Content<br>• Increase Brightness<br>• New Virtual Reality Content That Is More Intense |
| Reduce Intensity | • Decrease Volume<br>• Increase Ambient Light<br>• Decrease Brightness<br>• Slow Down Virtual Reality Content<br>• New Virtual Reality Content That Is Less Intense |
| Expand Viewport (User Not Paying Attention To Content Outside Field Of View) | • Put More Movement Or Colors At Edges Of The Screen<br>• Increase The Volume Of Surround Sound Speakers |
| Increase Focus | • Apply Vignette To Leave Focus Area Brighter Than Surrounding Environment<br>• Reduce Volume |
| Calm | • Decrease Volume<br>• Show Objects Or Scenes Previously Viewed<br>• Decrease Brightness<br>• Use Calming Color Tones<br>• New Virtual Reality Content Measured To Calm |
| Scare/Startle | • Make Movement More Jumpy Or Less Smooth<br>• Introduce More Sudden Movements<br>• Add Vibration<br>• New Virtual Reality Content Measured To Scare |

*FIG. 9*

UTILIZING BIOMETRIC DATA TO ENHANCE VIRTUAL REALITY CONTENT AND USER RESPONSE

BACKGROUND

Recent years have seen rapid development in the field of virtual reality. Indeed, due to advances in virtual reality technology, individuals can now utilize virtual reality devices to manipulate sensory perception (such as sight and hearing) and simulate the experience of physical presence in a virtual world. Accordingly, individuals and businesses currently utilize virtual reality devices in a variety of fields, such as entertainment, education, and employment. For example, virtual reality devices can now simulate the experience of traveling to a new location, driving a virtual vehicle, shopping in a virtual store, or listening to an instructor in a virtual classroom.

Although virtual reality systems have progressed in recent years, they still have several significant shortcomings. For instance, although conventional virtual reality systems can immerse users in a virtual environment, such systems are not well suited to providing customized virtual reality content. For example, although conventional virtual reality systems can provide a virtual reality game, conventional virtual reality systems are generally unable to customize the game to the unique experiences, responses, perceptions, and reactions of individual users. Similarly, although conventional virtual reality systems can provide a virtual shopping environment, conventional virtual reality systems are generally unable to customize the virtual shopping experience to the current perception and responses of individual users. These and other problems exist with regard to conventional virtual reality systems.

BRIEF SUMMARY

One or more embodiments of the present disclosure provide benefits and/or solve one or more of the foregoing or other problems in the art with systems and methods that provide virtual reality content based on user biometric data. In particular, in one or more embodiments, the disclosed systems and methods monitor biometric data corresponding to a user of a virtual reality device. The systems and methods then utilize the biometric data to select and provide virtual reality content to the user via the virtual reality device. For example, the disclosed systems and methods can monitor biometric data of a user and modify virtual reality content based on the biometric data to elicit a target user response and/or target user action.

To illustrate, in one or more embodiments, the disclosed systems and methods receive biometric data corresponding to a user of a virtual reality device. Moreover, the disclosed systems and methods determine baseline biometric characteristics of the user of the virtual reality device based on the biometric data. Further, the systems and methods determine a stimulus category for the user of the virtual reality device based on the baseline biometric characteristics. The systems and methods then select and provide virtual reality content to the user of the virtual reality device based on the stimulus category for the user.

By selecting and providing virtual reality content based on biometric data, the disclosed systems and methods provide customized content specific to a user's unique reaction profile (e.g., stimulus category), as well as specific to a user's real-time reactions to the content. Moreover, the disclosed systems and methods can modify virtual reality content to drive responses and actions (e.g., to elicit a particular target user response or target user action). Thus, the disclosed systems and methods can customize and control a user experience within a virtual environment.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 3A-3B illustrate a sequence diagram of a plurality of acts in a method of utilizing biometric data to select virtual reality content in accordance with one or more embodiments;

FIG. 9 illustrates a modification database in accordance with one or more embodiments;

DETAILED DESCRIPTION

Figure 1:
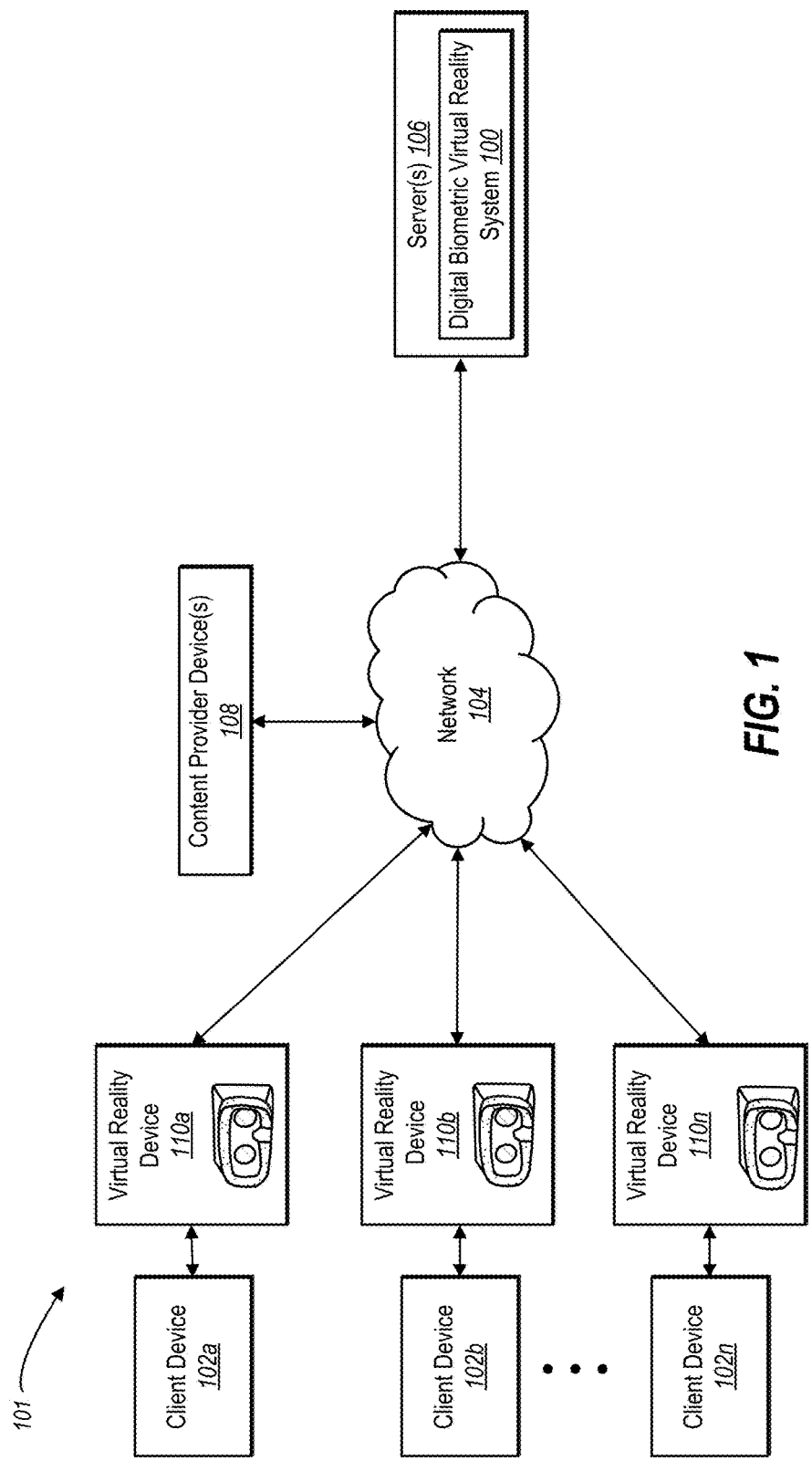
FIG. 1 illustrates a schematic diagram illustrating an exemplary environment in which a digital biometric virtual reality system may be implemented in accordance with one or more embodiments.

One or more embodiments of the present disclosure include a digital biometric virtual reality system that provides virtual reality content based on user biometric data. In particular, in one or more embodiments, the digital biometric virtual reality system monitors biometric data of a user of a virtual reality device and utilizes the biometric data to select and/or modify virtual reality content. For instance, the digital biometric virtual reality system identifies target user responses and/or target user actions and determines biometric response thresholds corresponding to the target user responses and/or target user actions. The digital biometric virtual reality system also monitors biometric data from a user, compares the biometric data to the biometric response thresholds, and provides modified virtual reality content to satisfy the biometric response thresholds. In this manner, the digital biometric virtual reality system can actively select virtual reality content based on real-time or near real-time biometric data corresponding to a user to elicit target user responses and/or target user actions.

For example, in one or more embodiments, the digital biometric virtual reality system manages a virtual reality content repository (i.e., a repository with a variety of virtual reality content). Moreover, the digital biometric virtual reality system determines biometric response thresholds corresponding to one or more target user responses. The digital biometric virtual reality system then receives biometric data of a user of a virtual reality device while providing virtual reality content from the virtual reality content repository to the user via the virtual reality device. By comparing the biometric data to biometric response thresholds corresponding to a target user response, the digital biometric virtual reality system can determine a user response to the virtual reality content. The digital biometric virtual reality system then provides modified virtual reality content from the virtual reality content repository based on the determined user response.

By utilizing biometric data to select or modify virtual reality content, the digital biometric virtual reality system provides customized virtual reality content unique to a particular user's sensibilities, real-time emotions, attitudes, and reactions. Indeed, as mentioned, the digital biometric virtual reality system monitors a user's biometric data and compares the biometric data to biometric response thresholds to determine user responses. Moreover, the digital biometric virtual reality system provides virtual reality content based on the user responses. Thus, the digital biometric virtual reality system can provide virtual reality content specific to a particular user response at a particular time.

In addition, the digital biometric virtual reality system also provides customized virtual reality content to elicit particular target user responses. For example, the digital biometric virtual reality system compares a user's biometric data to a biometric response threshold and provides virtual reality content to modify the user's physical condition and corresponding biometric data. For instance, the digital biometric virtual reality system determines that a user is bored by comparing biometric data with a biometric response threshold, and based on determining the user is bored, provides modified virtual reality content to make the user more engaged and/or excited. Alternatively, the digital biometric virtual reality system determines that a user is overstimulated (e.g., stressed) and provides modified virtual reality content to make the user more relaxed. Accordingly, the digital biometric virtual reality system provides virtual reality content based on real-time biometric data corresponding to a user to elicit a target user response from the user.

Moreover, the digital biometric virtual reality system can provide customized virtual reality content to encourage (or discourage) particular user actions. For example, the digital biometric virtual reality system determines a correspondence between biometric data and user action (e.g., for a particular user) and generates a biometric response threshold corresponding to a target user action. The digital biometric virtual reality system then monitors biometric data for a user, compares the biometric data to the biometric response threshold corresponding to the target user action, and provides modified virtual reality content to encourage the target user action.

Furthermore, the digital biometric virtual reality system improves the performance of devices implementing the digital biometric virtual reality system. Indeed, in addition to enhancing the digital virtual experience, the digital biometric virtual reality system also reduces wasted processing and memory in providing unnecessary and undesired virtual reality content. For example, the digital biometric virtual reality system determines, based on biometric data, that a user is not receptive to certain virtual reality content and exclude the virtual reality content. Similarly, the digital biometric virtual reality system can more quickly identify virtual reality content that a user desires, thus avoiding wasted resources in providing unwanted virtual reality content.

As mentioned above, in one or more embodiments, the digital biometric virtual reality system provides virtual reality content unique to individual users based on user biometric data. Indeed, in one or more embodiments, the digital biometric virtual reality system generates and applies biometric response thresholds based on the biometric data of individual users. For instance, the digital biometric virtual reality system monitors biometric data and determines baseline biometric characteristics of a user. Moreover, in one or more embodiments, the digital biometric virtual reality system identifies a stimulus category corresponding to a user based on the baseline biometric characteristics. For example, the digital biometric virtual reality system can utilize baseline biometric characteristics to determine that a user is easily excitable. The digital biometric virtual reality system can then select virtual reality content based on the stimulus category (e.g., select less stimulating virtual reality content for a person that is easily excitable).

In addition, in one or more embodiments, the digital biometric virtual reality system generates stimulus categories. Indeed, in one or more embodiments, the digital biometric virtual reality system monitors biometric data from a plurality of users and generates stimulus categories based on the collected data. For instance, the digital biometric virtual reality system can determine baseline biometric characteristics of a plurality of users and then analyze the baseline biometric characteristics to develop stimulus categories. To illustrate, the digital biometric virtual reality system can cluster users based on one or more baseline biometric characteristics and generate stimulus categories corresponding to each cluster.

Moreover, as mentioned above, the digital biometric virtual reality system can also provide virtual reality content based on biometric data to elicit a target user response. For instance, in one or more embodiments, the digital biometric virtual reality system generates biometric response thresholds corresponding to target user responses (e.g., a particular heart rate, breath pattern, and/or eye movement corresponding to a laugh). The digital biometric virtual reality system can monitor biometric data of a user and determine a user response by comparing the biometric data to the biometric response thresholds. For example, the digital biometric virtual reality system can determine that a user is not scared by comparing biometric data (e.g., low perspiration, slow eye movement, low heart rate, low breathing rate) to biometric response thresholds indicating biometric data levels that correspond to a user that is scared (e.g., increased perspiration, rapid eye movement, elevated heart rate, increased breathing rate, etc.).

Furthermore, the digital biometric virtual reality system can provide modified virtual reality content to elicit a target user response. For example, upon determining that a user is not scared, the digital biometric virtual reality system can provide modified virtual reality content to elicit a scared response. Thus, for instance, the digital biometric virtual reality system can alter music (e.g., play a more sinister sound track) or lighting (make lighting darker). Moreover, the digital biometric virtual reality system can provide new virtual reality content (e.g., add a frightening virtual reality avatar or play a new sequence of virtual reality video). The digital biometric virtual reality system can then continue monitoring biometric data to determine when a user has satisfied a biometric response threshold indicating a scared response.

In addition to utilizing biometric response thresholds, in one or more embodiments, the digital biometric virtual reality system also generates biometric response thresholds. For instance, in one or more embodiments, the digital biometric virtual reality system generates biometric response thresholds based on biometric data gathered from a plurality of users. To illustrate, the digital biometric virtual reality system can provide virtual reality content that is known to elicit a particular response (e.g., fear, sadness, happiness, laughter) to a plurality of users via virtual reality devices. The digital biometric virtual reality system can monitor biometric data corresponding to the virtual reality content and analyze the biometric data to determine biometric response thresholds.

Moreover, the digital biometric virtual reality system can generate various biometric response thresholds corresponding to different stimulus categories. For example, a stoic individual that is not easily excited may experience different physical characteristics and generate different biometric data than an individual that is easily excited or jumpy. As mentioned above, the digital biometric virtual reality system can generate various response categories and also generate different biometric response thresholds corresponding to different stimulus categories.

The digital biometric virtual reality system can also aggregate biometric data and identify a correspondence between biometric data and particular user actions, and based on the correspondence, the digital biometric virtual reality system then provides virtual reality content. For example, based on aggregate biometric data, the digital biometric virtual reality system determines that users in a particular stimulus category (e.g., easily excitable) tend to engage in a particular action (e.g., turn off a particular virtual reality game) based on certain biometric data (e.g., heart rate falls below a certain rate for more than particular period of time). The digital biometric virtual reality system then selects virtual reality content based on the correspondence (e.g., modifies virtual reality content to increase heart rate when users in the particular stimulus category have a heart rate that is sufficiently low for a particular time period).

Furthermore, in one or more embodiments, the digital biometric virtual reality system monitors biometric data from an individual over time and utilizes the historical biometric data to select virtual reality content for the individual. For example, the digital biometric virtual reality system generates individual biometric response thresholds specific to a user based on historical biometric data specific to the user. Similarly, the digital biometric virtual reality system can determine a correspondence between particular biometric data for a user and that user's actions, and accordingly, the digital biometric virtual reality system then selects virtual reality content based on the determined correspondence between particular biometric data and the user's actions.

By measuring biometric data of a user and providing virtual reality content based on the measured biometric data, the digital biometric virtual reality system can create a more customized, interactive, and responsive virtual reality experience. For example, the digital biometric virtual reality system can create virtual reality games that are more emotive and entertaining, virtual reality shopping that is more responsive and targeted, or virtual reality education that is more engaging and informative.

Turning now to FIG. 1, additional detail will be provided regarding an environment in which the digital biometric virtual reality system can operate. In particular, FIG. 1 illustrates a schematic diagram of an exemplary environment 101 in which one embodiment of a digital biometric virtual reality system 100 can operate. As illustrated, in one or more embodiments, the exemplary environment 101 includes one or more client devices 102a, 102b, . . . 102n, a network 104, server(s) 106, and content provider device(s) 108. The network 104 may be any suitable network over which the computing devices can communicate. Example networks are discussed in more detail below with regard to FIG. 14.

As illustrated in FIG. 1, the environment 101 may include client devices 102a-102n. The client devices 102a-102n may comprise various computing device. For instance, in one or more embodiments, one or more of the client devices 102a-102n comprise one or more computing devices described below in relation to FIG. 14. Moreover, as shown, the client devices 102a-102n include virtual reality devices 110a-110n.

As used herein, the term "virtual reality device" refers to a computing device that generates a digital, three-dimensional representation of a virtual environment. In particular, the term "virtual reality device" includes a computing device (e.g., a headset or head-mounted display) that generates a digital, three-dimensional view of a virtual environment that simulates a user's physical presence through a generated sensory experience (e.g., immersive visual display, speakers, etc.). To illustrate, a virtual reality device includes a head-mounted display that generates an immersive three-dimensional representation of a virtual environment that modifies a view of the virtual environment based on user movements to simulate physical presence in the virtual environment. Moreover, a virtual reality device can also comprise one or more sensors that detect user interaction. For example, a virtual reality device can comprise optical sensors, clothing, gloves, or other sensors to detect movements and/or hand gestures of a user. Similarly, the virtual reality device can comprise a user input device, such as a controller, remote control, joystick, or keyboard. In addition, a virtual reality device can include (and/or be operatively connected to) one or more biometric sensors to detect biometric data.

As used herein, the term "biometric data" refers to information regarding physical characteristics of a user. In particular, the term "biometric data" refers to measured information regarding physical conditions of a user's body. For example, biometric data includes information regarding a user's heart rate, blood pressure, body temperature, breathing rate, moisture readings (e.g., perspiration level), eye movement (e.g., magnitude, velocity, or frequency of eye movements), head movement (e.g., magnitude, velocity, or frequency of head movements), eye coloration (e.g., red eyes, clear eyes, teary eyes), pupil dilation, eye shape (e.g., the amount the eye is open or closed or eye brows raised), face shape (e.g., smiling, frowning, pursed lips, mouth open in shock), or brain waves.

Moreover, as used herein, the term "virtual environment" refers to a simulation of a physical presence in a setting or location (real or imagined, regardless of size). For example, a virtual environment can comprise a simulation of a physical presence in a building, a city, a market, a forest, a planet, outer space, a cell, or a particle.

In addition, the environment 101 may also include the server(s) 106. The server(s) 106 may generate, store, receive, and transmit any type of data. For example, the server(s) 106 may transmit data to a client device, such as the client device 102a and/or the virtual reality device 110a. The server(s) 106 can also transmit electronic messages between one or more users of the environment 101. In one example embodiment, the server(s) 106 comprise a content server. The server(s) 106 can also comprise a communication server or a web-hosting server. Additional details regarding the server(s) 106 will be discussed below with respect to FIG. 14.

As illustrated, in one or more embodiments, the server(s) 106 can include all, or a portion of, the digital biometric virtual reality system 100. In particular, the digital biometric virtual reality system 100 can comprise an application running on the server(s) 106 or a portion of a software application that can be downloaded from the server(s) 106. For example, the digital biometric virtual reality system 100 can include a web hosting application that allows the client devices 102a-102n and/or the virtual reality devices 110a-110n to interact with content hosted at the server(s) 106. To illustrate, in one or more embodiments of the exemplary environment 101, one or more client devices 102a-102n and/or virtual reality devices 110a-110n can access a webpage supported by the server(s) 106. In particular, the client device 102a and/or the virtual reality device 110a can run an application to allow a user to access, view, and/or interact with a webpage or website hosted at the server(s) 106.

Moreover, as shown in FIG. 1, the environment can also include the content provider device(s) 108. The content provider device(s) 108 can include a variety of computing devices. For example, the content provider device(s) 108 can include one or more computing devices described below in relation to FIG. 14. In particular, the content provider device(s) 108 can include computing devices operable to generate virtual reality content.

As used herein, the term "virtual reality content" (or "virtual reality content item") refers to information capable of being presented to a user via a virtual reality device. In particular, the term "virtual reality content" includes digital visual or audio information capable of being presented to a user via a virtual reality device. For example, the term virtual reality content includes virtual reality video (e.g., digital video, three-dimensional videos, and/or spherical panorama digital videos), virtual reality images (e.g., digital images, three-dimensional images and/or spherical panorama digital images), virtual reality avatars, virtual reality structures, virtual locations, virtual environments, virtual objects, music, or sound effects provided to a user via a virtual reality device. Virtual reality content can also include heptic content, such as causing vibration of a virtual reality device, controller, chair, watch, or wearable device (e.g., increase or start "rumbling" of a controller).

Although FIG. 1 illustrates a particular arrangement of the client devices 102a-102n, the network 104, the server(s) 106, the content provider device(s) 108, and the virtual reality devices 110a-110n various additional arrangements are possible. For example, while FIG. 1 illustrates multiple separate client devices 102a-102n and/or virtual reality devices 110a-110n communicating with the server(s) 106 via the network 104, in one or more embodiments a single client device may communicate directly with the server(s) 106, bypassing the network 104.

Similarly, although the environment 101 of FIG. 1 is depicted as having various components, the environment 101 may have additional or alternative components. For example, the digital biometric virtual reality system 100 can be implemented on a single computing device. In particular, the digital biometric virtual reality system 100 may be implemented in whole by the client device 102a (or the virtual reality device 110a) or the digital biometric virtual reality system 100 may be implemented in whole by the server(s) 106. Alternatively, the digital biometric virtual reality system 100 may be implemented across multiple devices or components (e.g., utilizing the client devices 102a-102n, the server(s) 106, the content provider devices 108, and the virtual reality devices 110a-110n).

By way of example, in one or more embodiments, the content provider device(s) 108 generate virtual reality content and designate one or more target user responses and/or target user actions corresponding to the virtual reality content. As used herein, the term "user response" refers to a characteristic, condition, or state of a user. The term "user response" includes an emotional or physical state or condition of a user. For example, the term "user response" includes a state of being happy, sad, excited, worried, stressed, relaxed, calm, startled, focused, tired, or scared.

In addition, the term "target user response" refers to a chosen, selected, wanted, unwanted, preferred, or disfavored user response. In particular, the term "target user response" refers to a user response that is sought to be elicited or avoided. For example, a target user response can include a user response that a content provider seeks to elicit from a user experiencing virtual reality content (e.g., a content provider seeks to make a virtual reality video game player feel scared). A target user response can also include a user response that a content provider seeks to avoid (e.g., a content provider that provides a virtual reality tour of a vacation destination seeks to avoid fear or anxiety).

Moreover, the term "user action" refers to any conduct (or lack of conduct), behavior, activity, or user input. In particular, the term user action includes conduct, behavior, or user input of a user of a virtual reality device. To illustrate, the term "user action" includes purchasing a product, interacting with a virtual element within a virtual environment, starting (or stopping) an activity (e.g., starting a virtual reality game or leaving a virtual reality shopping center), an amount of time spent on a particular activity (e.g., an amount of time looking at a virtual reality movie), turning on (or turning off) a device (e.g., turning off a virtual reality device), or changing a location (e.g., entering or leaving a virtual location).

Similarly, a "target user action" refers to a chosen, selected, wanted, unwanted, preferred, or disfavored user action. For example, a target user action can include a user action that a content provider seeks to elicit from a user experiencing virtual reality content (e.g., a content provider seeks to have a user purchase a product after experiencing virtual reality content). A target user action can also include a user action that a content provider seeks to avoid (e.g., a content provider that wants to avoid a user leaving a particular location in a virtual environment).

Moreover, in one or more embodiments, the content provider device(s) 108 provide the virtual reality content and target user responses/target user actions to the server(s) 106. The server(s) 106 determine biometric response thresholds corresponding to the target user responses/target user actions. As used herein, the term "biometric response threshold" refers to a defined level of biometric data. In particular, the term "biometric response threshold" refers to a defined level of biometric data that corresponds to a user response. For instance, a biometric response threshold can include a biometric data level that indicates a target user response. For example, a target user response of laughing can correspond to a biometric response threshold that includes a minimum heart rate, an eye shape (e.g., eyes squinting when smiling), and a breathing rate.

A biometric response threshold can comprise a plurality of different levels corresponding to different biometric data measures or a score reflecting multiple biometric data measures. For example, a biometric response threshold includes a minimum heart rate level, a minimum breathing rate level, and a required face shape. A biometric response threshold can also include a score generated by combining multiple different biometric data measures. To illustrate, the biometric response threshold can include a score based on weighting a breathing rate, a percent change in heart rate, and face shape.

In one or more embodiments, the client device 102a receives, via the virtual reality device 110a, biometric data corresponding to a user of the virtual reality device 110a. Moreover, the client device 102a provides the biometric data to the server(s) 106. Further, the server(s) 106 determine baseline biometric characteristics based on the biometric data and a stimulus category corresponding to the user of the virtual reality device 110a. As used herein, the term "baseline biometric characteristics" refer to standardized biometric data corresponding to a user. In particular, "baseline biometric characteristics" include benchmark physical characteristics of a user that can be compared to corresponding physical characteristics of other users.

As used herein, the term "stimulus category" refers to a classification based on physical characteristics of a user. In particular, the term "stimulus category" refers to a classification based on biometric data of a user (e.g., baseline biometric characteristics). For instance, the term "stimulus category" includes a classification that reflects a user's physical response to different stimuli. For example, in one or more embodiments, the digital biometric virtual reality system generates stimulus categories, such as "easily excitable," or "stoic." The digital biometric virtual reality system need not, however, assign verbal labels to a stimulus category. For instance, rather than (or in addition to) defining a stimulus category utilizing a label (such as "easily excitable") the digital biometric virtual reality system can define a stimulus category based on biometric data metrics (e.g., resting heart rate between 50 and 70 and resting breathing rate between 5 and 6 breaths per minute).

In addition, in one or more embodiments, the server(s) 106 provide virtual reality content to the client device 102a and/or the virtual reality device 110a. The client device 102a and/or the virtual reality device 110a present the virtual reality content and continue monitoring biometric data. The client device 102a and/or the virtual reality device 110a send the biometric data to the server(s) 106. The server(s) 106 select modified virtual reality content based on the biometric data and the biometric response thresholds and provide the modified virtual reality content to the client device 102a and/or the virtual reality device 110a. The client device 102a and/or the virtual reality device 110a present the modified virtual reality content to the user and continue to monitor biometric data.

Furthermore, the server(s) 106 can gather and aggregate biometric data from a plurality of client devices. For example, the server(s) 106 can receive biometric data corresponding to users of the virtual reality devices 110b-110n. The server(s) 106 can aggregate and analyze the biometric data to determine trends. For example, the server(s) 106 can determine biometric response thresholds corresponding to target user responses and/or target user actions.

Figure 2:
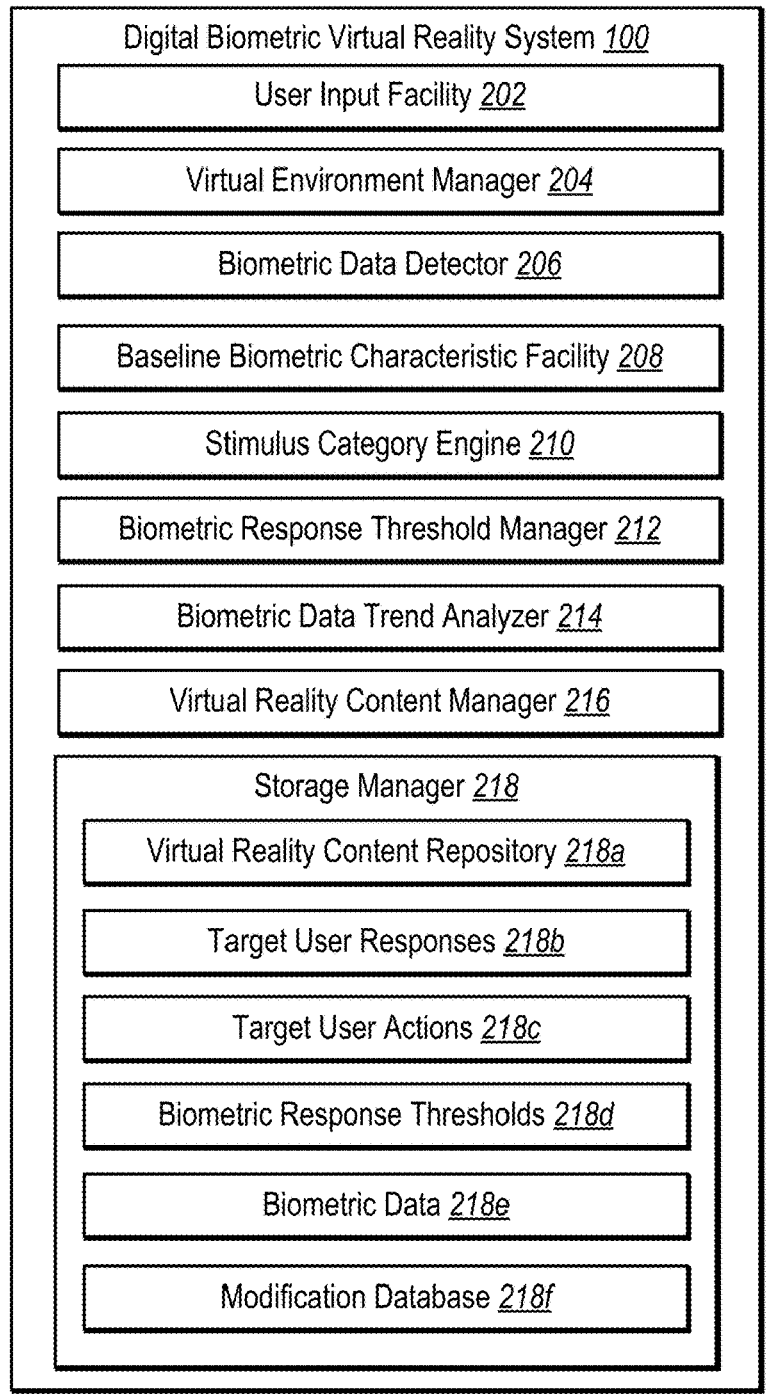
FIG. 2 illustrates a schematic diagram illustrating the digital biometric virtual reality system in accordance with one or more embodiments.

Turning now to FIG. 2, additional detail is provided regarding components and capabilities of one embodiment of the digital biometric virtual reality system 100. As shown, the digital biometric virtual reality system 100 may include, but is not limited to a user input facility 202, virtual environment manager 204, a biometric data detector 206, a baseline biometric characteristic facility 208, a stimulus category engine 210, a biometric response threshold manager 212, a biometric data trend analyzer 214, a virtual reality content manager 216, and a storage manager 218 (including a virtual reality content repository 218a, target user responses 218b, target user actions 218c, biometric response thresholds 218d, biometric data 218e, and a modification database 218f).

As just mentioned, and as illustrated in FIG. 2, the digital biometric virtual reality system 100 may include the user input facility 202. The user input facility 202 can identify detect, monitor, and/or determine a user interaction or user input with respect to a variety of user interface elements (i.e., virtual elements in a virtual environment). For example, in relation to a virtual reality device, the user input facility 202 can identify or detect selection of a graphical button portrayed as part of a virtual environment via a virtual reality device. The user input facility 202 also monitor, measure, and/or analyze user input to determine user actions. For example, the user input facility 202 can analyze user input to determine that a user has purchased a virtual product, entered a virtual location, or interacted with a virtual item for a particular period of time.

As shown in FIG. 2, the digital biometric virtual reality system 100 also includes the virtual environment manager 204. The virtual environment manager 204 can generate, create, modify, manage, and/or provide a virtual environment. For instance, the virtual environment manager 204 can create a virtual environment comprising virtual objects, virtual individuals, virtual locations, and/or virtual products.

Moreover, the virtual environment manager 204 can provide a user interface portraying a virtual environment to a virtual reality device. In particular, the virtual environment manager 204 can generate and/or provide a three-dimensional representation of a virtual environment. For example, the virtual environment manager 204 can generate and/or provide a three-dimensional representation of a virtual environment that adjusts to simulate a physical presence in the virtual environment. Furthermore, the virtual environment manager 204 can generate various user interface elements in the virtual environment for providing a variety of types of information, including text, images, video, audio, characters, or other information (e.g., display icons, dialogue boxes, banners, buttons, pop-ups, text boxes, or selection menus).

The virtual environment manager 204 can also modify a virtual environment based on user interaction from one or more users. For example, virtual environment manager 204 can generate a three-dimensional representation of other users within a virtual environment. Accordingly, a user can meet and interact with other users in real time. The virtual environment manager 204 can modify the virtual environment as users move through and/or otherwise interact with the virtual environment.

In addition, as illustrated in FIG. 2, the digital biometric virtual reality system 100 also includes the biometric data detector 206. The biometric data detector 206 can measure, identify, detect, receive and/or determine biometric data. The biometric data detector 206 can determine biometric data from a variety of biometric sensors, as described above. For example, the biometric data detector 206 can detect biometric data from sensors affixed to a virtual reality device or a remote biometric sensor.

Moreover, as illustrated in FIG. 2, the digital biometric virtual reality system 100 also includes the baseline biometric characteristic facility 208. The baseline biometric characteristic facility 208 can generate, determine, identify, and/or calculate baseline biometric characteristics. In particular, the baseline biometric characteristic facility 208 can analyze biometric data (e.g., biometric data from the biometric data detector 206) and determine baseline biometric characteristics. For example, the baseline biometric characteristic facility 208 can analyze biometric data and determine resting breathing rate, basal temperature, and a change in breathing rate (e.g., a change in breathing rate corresponding to a change in standardized virtual reality content).

As illustrated in FIG. 2, the digital biometric virtual reality system 100 also includes the stimulus category engine 210. The stimulus category engine 210 can generate, determine, identify, and/or assign one or more response categories. For example, as described above, the stimulus category engine 210 can analyze biometric data (e.g., form the biometric data detector 206) and/or baseline biometric characteristics (e.g., from the baseline biometric characteristic facility 208) and determine one or more response categories. To illustrate, the stimulus category engine 210 can cluster a plurality of users based on baseline biometric characteristics and determine response categories corresponding to the clusters.

As shown in FIG. 2, the digital biometric virtual reality system 100 also includes the biometric response threshold manager 212. The biometric response threshold manager 212 can generate, determine, identify, and/or calculate one or more biometric response thresholds. For example, the biometric response threshold manager 212 can generate biometric response thresholds that correspond to target user responses and/or target user actions. For instance, the biometric response threshold manager 212 can generate maximum biometric response thresholds (corresponding to maximum target user responses) or minimum biometric response thresholds (corresponding to minimum target user responses).

The biometric response threshold manager 212 can generate biometric response thresholds based on biometric data from a plurality of users. For example, the biometric response threshold manager 212 can utilize trends in biometric data (e.g., identified via the biometric data trend analyzer 214) corresponding to users experiencing known virtual reality content to determine biometric response thresholds corresponding to target user responses. Similarly, the biometric response threshold manager 212 can utilize trends in biometric data (e.g., a correspondence between biometric data and user actions identified via the biometric data trend analyzer 214) to determine biometric response thresholds corresponding to target user actions. As described above, the biometric response threshold manager 212 can also generate biometric response thresholds particular to different response categories and/or different individuals.

Furthermore, as shown in FIG. 2, the digital biometric virtual reality system 100 also includes the biometric data trend analyzer 214. The biometric data trend analyzer 214 can analyze biometric data corresponding to individual users or groups of users to determine, identify, calculate, or generate trends in the biometric data. For example, the biometric data trend analyzer 214 can analyze biometric data to determine a correspondence between user actions and biometric data (e.g., user's experience certain biometric data prior to engaging in a particular action). In addition the digital biometric virtual reality system 100 can determine a determine trends in biometric data corresponding to virtual reality content (e.g., scary virtual reality content, calm virtual reality content, etc.).

In addition to the biometric data trend analyzer 214, as illustrated in FIG. 2, the digital biometric virtual reality system 100 also includes the virtual reality content manager 216. The virtual reality content manager 216 can generate, select, identify, modify and/or provide virtual reality content. For example, the virtual reality content manager 216 can generate virtual reality content and corresponding target user preferences.

Moreover, the virtual reality content manager 216 can select virtual reality content to provide (e.g., to provide via the virtual environment manager 204). For example, the virtual reality content manager 216 can select virtual reality content based on biometric data and a target user response. To illustrate, the virtual reality content manager 216 can compare biometric data and biometric response thresholds corresponding to target user responses. For instance, the virtual reality content manager 216 can determine a user response by comparing biometric data and a biometric response threshold and then select virtual reality content based on the user response. Specifically, the virtual reality content manager 216 can select virtual reality content based on a user response to elicit a target user response (e.g., to satisfy the biometric response threshold corresponding to the target user response).

The virtual reality content manager 216 can also select virtual reality content to promote a target user action based on biometric data. For example, the virtual reality content manager 216 can select virtual reality content to elicit a target user action based on a biometric response threshold (e.g., based on a correspondence between the target user action and biometric data identified by the biometric data analyzer 214). To illustrate, the digital biometric virtual reality system 100 can provide modified virtual reality content to increase a user's heart rate, where increased heart rate corresponds to a desired user action (e.g., purchasing a product in a virtual environment).

Moreover, as illustrated in FIG. 2, the digital biometric virtual reality system 100 also includes the storage manager 218. The storage manager 218 maintains data to perform the functions of the digital biometric virtual reality system 100. As illustrated, the storage manager 218 includes the virtual reality content repository 218a (e.g., a plurality of virtual reality content items and relationships between the plurality of virtual reality content items), the target user responses 218b (e.g., target user response corresponding to the virtual reality content items), target user actions 218c (e.g., target user actions corresponding to virtual reality content), biometric response thresholds 218d (e.g., biometric response thresholds corresponding to target user responses and/or target user actions), biometric data 218e (e.g., biometric data corresponding to one or more users), and the modification database 218f (e.g., a database, look-up table, matrix, algorithm, or neural network indicating modifications corresponding to target user preferences or changes in biometric data).

Each of the components 202-218 of the digital biometric virtual reality system 100 (as shown in FIG. 2) may be in communication with one another using any suitable communication technologies. It will be recognized that although components 202-218 of the digital biometric virtual reality system 100 are shown to be separate in FIG. 2, any of components 202-218 may be combined into fewer components, such as into a single facility or module, divided into more components, or configured into different components as may serve a particular embodiment.

The components 202-218 of the digital biometric virtual reality system 100 can comprise software, hardware, or both. For example, the components 202-218 can comprise one or more instructions stored on a computer-readable storage medium and executable by processors of one or more computing devices. When executed by the one or more processors, the computer-executable instructions of the digital biometric virtual reality system 100 can cause a client device and/or a server device to perform the methods described herein. Alternatively, the components 202-218 and their corresponding elements can comprise hardware, such as a special purpose processing device to perform a certain function or group of functions. Additionally, the components 202-218 can comprise a combination of computer-executable instructions and hardware.

Furthermore, the components 202-218 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 202-218 may be implemented as a stand-alone application, such as a desktop or mobile application. Furthermore, the components 202-218 may be implemented as one or more web-based applications hosted on a remote server. The components 202-218 may also be implemented in a suit of mobile device applications or "apps." To illustrate, the components 202-218 may be implemented in an application, including but not limited to ADOBE PHOTOSHOP software, ADOBE ILLUSTRATOR software, ADOBE PREMIERE software. "ADOBE," "PHOTOSHOP," "ILLUSTRATOR," and "PREMIERE" are either registered trademarks or trademarks of Adobe Systems Incorporated in the United States and/or other countries.

Figure 3B:
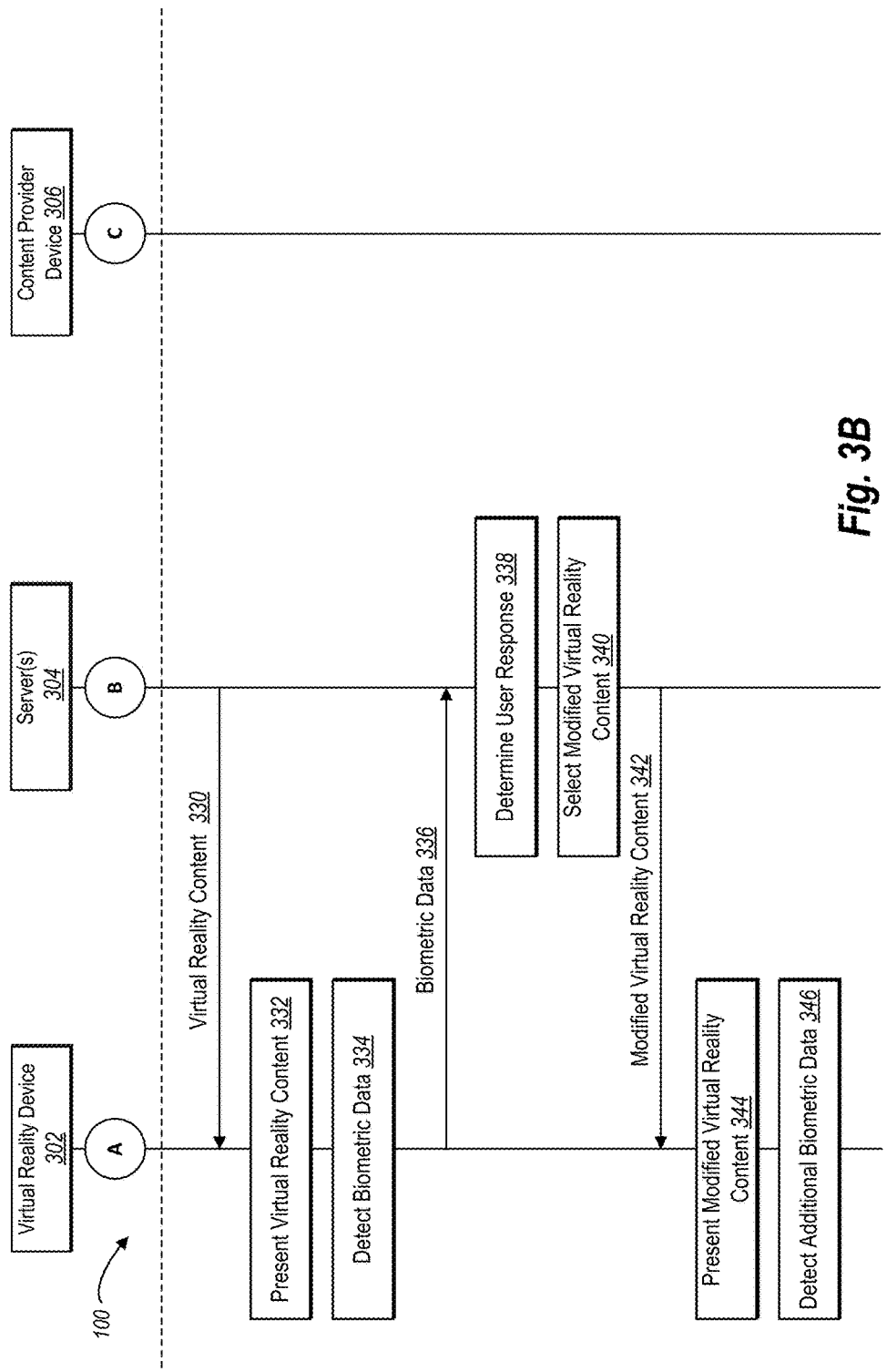

Turning now to FIGS. 3A-3C, additional detail will be provided regarding utilizing biometric data to provide virtual reality content in accordance with one or more embodiments of the digital biometric virtual reality system. In particular, FIGS. 3A-3B illustrate a representation of a sequence of acts 308-346 performed by the digital biometric virtual reality system 100 for providing virtual reality content utilizing biometric data.

As shown in FIG. 3A-3B, the digital biometric virtual reality system 100 resides in part on a virtual reality device 302 (e.g., the virtual reality device 110a), server(s) 304 (e.g., the server(s) 106), and/or a content provider device 306 (e.g., the content provider device(s) 108). In particular, the digital biometric virtual reality system 100 can comprise computer-executable instructions that, when executed by the virtual reality device 302, the server(s) 304, and/or the content provider device 306, cause the virtual reality device 302, the server(s) 304, and/or the content provider device 306 to perform the acts 308-346 shown in the sequence diagram of FIGS. 3A-3B.

For example, the virtual reality device 302 of FIG. 3 includes a computing device with a head-mounted display and speakers. The virtual reality device 302 can provide a view of a virtual environment via the head-mounted display and modify the view of the virtual environment based on user movements to simulate physical presence in the virtual environment The virtual reality device 302 also includes a number of biometric data sensors. Specifically, the virtual reality device 302 includes a hear rate monitor (e.g., a monitor with an optical sensor that measures pulse through the skin), a breathing rate monitor (e.g., a sensitive microphone that detects breathing rate and volume, a strap that measures expansion of the lungs, and/or sensors that measure oxygen in the blood), a blood pressure monitor (e.g., sensors that measure blood pressure through contact with the forehead or other part of the body), a temperature sensor (e.g., a monitor affixed to the forehead, ears, mouth, etc.), a head motion sensor (e.g., gyroscopes, accelerometers, and other sensors for tracking head movement), a moisture sensor (e.g., a sensor that detects perspiration at the forehead or other parts of the body), an eye sensor (e.g., a camera pointed towards the eyes that track eye movement, whether the eyes are open or closed, eye coloration, and/or pupil dilation), or a face shape monitor (e.g., a camera pointed towards all or part of a face to track, for example, mouth shape). In other embodiments, the virtual reality device 302 can include a subset of these biometric sensors and/or additional biometric sensors.

As illustrated in FIG. 3A, the digital biometric virtual reality system 100 performs the act 308 of generating stimulus categories. For example, in relation to FIG. 3A, the digital biometric virtual reality system 100 generates stimulus categories by collecting and analyzing biometric data of a plurality of users. For instance, the digital biometric virtual reality system 100 collects biometric data of a plurality of users and clusters the plurality of users based on the biometric data. The digital biometric virtual reality system then utilizes the clusters as stimulus categories. Additional detail regarding generating stimulus categories in accordance with one or more embodiments is provided below in relation to FIG. 4.

As shown in FIG. 3A, the digital biometric virtual reality system 100 can also perform the act 310 of generating virtual reality content. In particular, the act 310 of generating virtual reality content can include generating a virtual environment with various visual and audible components. For example, the act 310 can include generating an immersive spherical, panorama digital video that portrays a variety of objects, individuals, and/or locations within a virtual environment. Similarly, the act 310 can include generating an immersive video game that includes music, sound effects, structures, and avatars within a virtual environment.

As shown in FIG. 3A, the digital biometric virtual reality system 100 can also perform the act 312 of identifying target user response(s) and/or target user action(s). The act 312 can include selection of a target user response and/or target user action corresponding to virtual reality content. For instance, the act 312 can include a content provider selecting virtual reality content (e.g., one or more virtual reality videos) and a corresponding target user response (e.g., a request to make a user watching virtual reality content feel happy). Similarly, the act 312 can also include a content provider selecting virtual reality content and a corresponding target user response (e.g., a request to have a user purchase a product after experiencing the virtual reality content).

In one or more embodiments, the acts 310, 312 of generating virtual reality content and identifying target user responses can be performed by a one or more software products on the content provider device 306. For example, the content provider device 306 can implement a creative suite of products that allow a user to select and generate virtual reality content. Moreover, the content provider device 306 can provide a user interface that allows for selection of target user responses and/or target user actions corresponding to the virtual reality content.

For example, the content provider device 306 can provide a user interface that includes user interface elements that indicate different virtual reality content and additional user interface elements that allow for selection of target user responses and/or target user actions. As a content provider generates virtual reality content (or after virtual reality content has been generated), a content provider can interact with the user interface elements and select target user responses and/or target user actions corresponding to all or a portion of the virtual reality content. For example, the content provider can select a first target user response corresponding to a first portion of a virtual reality video and a second target user response corresponding to a second portion of a virtual reality video. Similarly, the content provider can select a first target user action and a second target user action corresponding to different portions of virtual reality content.

In addition to identifying target user responses and/or target user actions, the digital biometric virtual reality system 100 can also identify customizable features of virtual reality content. In particular, the digital biometric virtual reality system 100 can identify features of the virtual reality content that can be modified to generate a target user response and/or target user action. For example, the content provider device 306 can indicate that volume, brightness, color, sound effects, music, or other customizable features can be altered to generate a target user response.

The content provider device 306 can also indicate relationships between virtual reality content that to generate a target user response and/or target user action. For example, the content provider device 306 can generate a plurality of virtual reality content items and indicate that the plurality of virtual reality content items can be utilized together (or alternatively) to generate a target user response. To illustrate, the content provider device 306 can provide a plurality of virtual reality video segments that portray alternate storylines. The content provider device 306 can indicate which virtual reality video segments can be selected in what orders to generate a target user response.

As shown in FIG. 3A, the digital biometric virtual reality system 100 can also perform the act 314 of providing the virtual reality content, target user response(s), and/or target user action(s) to the server(s) 304. For example, the act 314 can include providing virtual reality content together with an indication of target user responses and/or target user actions corresponding to all or portions of the virtual reality content. Moreover, the act 314 can also include providing an indication of customizable features of the virtual reality content for eliciting the target user response(s) and/or target user action(s).

As shown in FIG. 3A, the digital biometric virtual reality system 100 can also perform the act 316 of determining a biometric response threshold(s) corresponding to target user response(s) and/or target user action(s). For example, the digital biometric virtual reality system 100 can receive a target user response (e.g., an indication that a user should be "sad") and determine biometric response thresholds corresponding to the target user response (e.g., a particular mouth shape, eye shape, and/or eye coloration corresponding to a sad response). Similarly, the digital biometric virtual reality system 100 can receiver a target user action (e.g., that a user should watch a virtual reality video for a particular period of time) and the digital biometric virtual reality system 100 can determine biometric response thresholds corresponding to the target user action (e.g., a particular eye movement and head movement that a user exhibits when a user watches a virtual reality video for the period of time).

In one or more embodiments, the digital biometric virtual reality system 100 determines biometric response thresholds by aggregating and analyzing biometric data from a plurality of users. For example, the digital biometric virtual reality system 100 can provide known virtual reality content (i.e., content that is known to induce a particular user response) to a plurality of users via a plurality of virtual reality devices. The digital biometric virtual reality system 100 can monitor biometric data of the plurality of users as they experience the known virtual reality content and determine biometric response thresholds corresponding to particular user responses.

Similarly, the digital biometric virtual reality system 100 determines biometric response thresholds corresponding to target user actions by aggregating and analyzing biometric data. For example, the digital biometric virtual reality system 100 can analyze biometric data and determine a correspondence between the biometric data and user actions. The digital biometric virtual reality system 100 can then utilize the correspondence between the biometric data and the user actions to generate biometric response thresholds corresponding to the user actions.

As mentioned previously, the digital biometric virtual reality system 100 can also select virtual reality content based on biometric data and biometric response thresholds. Indeed, the digital biometric virtual reality system 100 can detect and analyze biometric data of a user to select virtual reality content. Specifically, the digital biometric virtual reality system 100 can compare biometric data of a user to biometric response thresholds to provide virtual reality content.

For example, as shown in FIG. 3A, the digital biometric virtual reality system 100 performs the acts 318, 320 of determining types of biometric measures and detecting initial biometric data. For instance, the act 318 can include determining types of biometric measures available for collection. Indeed, because different devices can have access to different biometric sensors that detect different types of biometric measures, the digital biometric virtual reality system 100 at the act 318 can determine what types of biometric measures the virtual reality device 302 can capture. For instance, the act 318 can include determining what biometric sensors are available and what types of biometric measures the biometric sensors are capable of collecting.

Although the act 318 is illustrated in FIG. 3A as being performed by the virtual reality device 302, it will be appreciated that one or more biometric sensors may operate separately from the virtual reality device 302. For example, the digital biometric virtual reality system 100 may utilize a separate wearable device (e.g., chest strap or smart clothing) that is separate from the virtual reality device 302 to detect heart rate and/or breathing rate. Similarly, the digital biometric virtual reality system may utilize a camera separate from the virtual reality device 302 to detect face shape. The digital biometric virtual reality system 100 can perform the act 318 utilizing an available biometric sensor, regardless of whether the biometric sensor is affixed to the virtual reality device 302.

Moreover, as shown in FIG. 3A, the digital biometric virtual reality system 100 can also perform the act 320 of detecting initial biometric data. The act 320 can include receiving biometric data from biometric sensors. Moreover, the act 320 can include monitoring biometric data for a particular period of time or monitoring biometric while presenting particular virtual reality content. For instance, the digital biometric virtual reality system can receive biometric data for an initial period of time (e.g., one minute or thirty seconds). Moreover, the act 320 can include providing standardized virtual reality content via the virtual reality device 302 and monitoring biometric data while providing the standardized virtual reality content. As used herein, the term "standardized virtual reality content" refers to common virtual reality content provided to a plurality of users. For example, standardized virtual reality content can include a common virtual reality movie, a common image, or a blank screen.

As shown in FIG. 3A, the digital biometric virtual reality system 100 also performs the act 322 of providing initial biometric data and/or the types of biometric to the server(s) 304. Moreover, upon receiving the initial biometric data and/or the types of biometric measures, the server(s) 304 can perform the act 324 of determining baseline biometric characteristics.

For example, the digital biometric virtual reality system can collect biometric data of a user and determine a user's resting heart rate based on the biometric data. In such circumstances, the resting heart rate is a baseline biometric characteristic (i.e., a standardized benchmark physical characteristic that can be compared to other users). A baseline biometric characteristic can also include resting breathing rate, resting eye shape, basal temperature, or relaxed face shape. In addition, a baseline biometric characteristic can include excited heart rate (e.g., heart rate after showing intense virtual reality content), excited breathing rate, or excited perspiration levels. Baseline biometric characteristics can also reflect a change in biometric data. For example, a baseline biometric characteristic can include a change in temperature, breathing rate, heart rate, face shape, or blood pressure (e.g., changes in biometric data corresponding to a change in virtual reality content from calm to intense).

Accordingly, in relation to the embodiment of FIG. 3A, the digital biometric virtual reality system 100 performs the act 324 of determining baseline biometric characteristics by analyzing the biometric data received from the virtual reality device. In particular, the digital biometric virtual reality system 100 analyzes the biometric data to determine a resting breathing rate, a resting heart rate, a basal temperature, a change in breathing rate upon showing intense virtual reality content, a change in heart rate upon showing intense virtual reality content, and a change in temperature upon showing intense virtual reality content.

Upon determining baseline biometric characteristics, as shown in FIG. 3A, the digital biometric virtual reality system also performs the act 326 of determining a stimulus category. In particular, the act 326 includes determining a stimulus category from the stimulus categories generated in the act 308. For instance, the act 326 can include comparing baseline biometric characteristics with the stimulus categories to determine a stimulus category that corresponds to the user of the virtual reality device 302. To illustrate, the act 326 can compare baseline biometric characteristics with biometric data metrics corresponding to the stimulus categories to identify a stimulus category that most closely matches the baseline biometric characteristics corresponding to the user of the virtual reality device 302 (e.g., identify a stimulus category that corresponds to the same resting breathing rate as the user of the virtual reality device 302).

As shown in FIG. 3A, the digital biometric virtual reality system 100 performs the act 328 of determining virtual reality content and biometric response thresholds. The act 328 can include selecting virtual reality content based on user input (e.g., user selection of a video game or a virtual reality movie) and identifying biometric response thresholds corresponding to the selected virtual reality content.

The step 328 can also include selecting virtual reality content (and corresponding biometric response thresholds) based on a variety of factors, such as a user's demographic information, purchase history, location, or interests. Moreover, the act 328 can include determining virtual reality content and corresponding biometric response thresholds based on the baseline biometric characteristics (identified in the act 324) and/or the stimulus category (identified in the act 326). For example, the digital biometric virtual reality system 100 can select virtual reality content for users belonging to a particular stimulus category (e.g., a calming virtual reality movie for individuals that belong to the easily excitable category).

The digital biometric virtual reality system 100 can also determine biometric response thresholds based on a variety of factors. For example, the digital biometric virtual reality system 100 can select biometric response thresholds based on the types of biometric measures (e.g., the types of biometric measures detected at the act 318). To illustrate, if the virtual reality device 302 has access to three particular biometric measures, the digital biometric virtual reality system 100 can select biometric response thresholds that include the three particular biometric measures.

Similarly, the digital biometric virtual reality system 100 can determine biometric response thresholds based on baseline biometric characteristics and/or stimulus categories. To illustrate, the digital biometric virtual reality system 100 can select biometric response thresholds specific to a "stoic" user and/or a user with a low resting heart rate.

As shown in FIG. 3B, upon determining virtual reality content and biometric response thresholds, the digital biometric virtual reality system 100 can perform the act 330 of sending the virtual reality content to the virtual reality device 302. Moreover, the virtual reality device 302 can perform the act 332 of presenting the virtual reality content. For example, the virtual reality device 302 can present a virtual reality movie, a virtual reality game, a virtual reality character, or other virtual reality content to the user of the virtual reality device 302.

Moreover, as shown in FIG. 3B, the digital biometric virtual reality system 100 can also perform the act 334 of detecting biometric data. In particular, the digital biometric virtual reality system 100 can detect biometric data of the user of the virtual reality device 302 while the virtual reality device 302 presents the virtual reality content. Moreover, the digital biometric virtual reality system 100 can perform the act 336 of sending the detected biometric data to the server(s) 304.

Upon receiving biometric data, the digital biometric virtual reality system 100 can perform the act 338 of determining a user response. In particular, the act 338 can include determining a user response based on the biometric data. For example, the digital biometric virtual reality system 100 can compare the biometric data with the biometric response threshold to determine a user response (e.g., determine that a user is not scared because the biometric data has not satisfied the biometric response threshold corresponding to a scared target user response).

As illustrated in FIG. 3B, upon determining a user response, the digital biometric virtual reality system 100 can also perform the act 340 of selecting modified virtual reality content. In particular, the digital biometric virtual reality system 100 can select modified virtual reality content based on the determined user response, the biometric response threshold, the target user response, and/or the target user action. For example, the digital biometric virtual reality system can determine that the biometric data indicates that the user has not satisfied the biometric response threshold corresponding to the target user response (and/or the target user action). In response, the digital biometric virtual reality system 100 can modify the virtual reality content in an effort to reach the target user response (and/or target user action) and satisfy the biometric response threshold. For example, the digital biometric virtual reality system 100 can modify the appearance of the virtual reality content (e.g., increase brightness), modify the audio of the virtual reality content (e.g., modify the volume or music of the virtual reality content), or select new virtual reality content (e.g., select a new digital video to display).

As illustrated in FIG. 3B, the digital biometric virtual reality system 100 performs the act 342 of providing the modified virtual reality content to the virtual reality device 302. Moreover, the digital biometric virtual reality system 100 performs the act 344 of presenting the modified virtual reality content. Furthermore, the digital biometric virtual reality system 100 can perform the act 346 of detecting additional biometric data. Indeed, the digital biometric virtual reality system 100 can continue detecting biometric data, determining user responses, selecting modified virtual reality content, and providing virtual reality content user (e.g., repeating the acts 334-344). For example, the digital biometric virtual reality system 100 can continue to provide modified virtual reality content until satisfaction of a target user response, until a user performs a certain action, or until completion of selected virtual reality content (e.g., until a video game is complete).

Although FIGS. 3A-3B illustrate the acts 308-346 being implemented by particular devices of the digital biometric virtual reality system 100, the digital biometric virtual reality system 100 can perform the acts utilizing other devices or components. For example, in one or more embodiments, the digital biometric virtual reality system 100 and the acts 308-346 are implemented by a single computing device. In particular, the digital biometric virtual reality system 100 (and the acts 308-346) may be implemented in whole by the virtual reality device 302 or the server(s) 304. Alternatively, the digital biometric virtual reality system 100 may be implemented across multiple devices or components, with different components performing different acts.

For example, although FIG. 3A illustrates the content provider device 306 providing virtual reality content and target user responses to the server(s) 304 (at the act 314) and the server(s) 304 determining biometric response thresholds (at the act 316), in one or more embodiments, the content provider device 306 can determine biometric response thresholds corresponding to target user responses. Similarly, rather than generating virtual reality content and identifying target user responses via the content provider device 306 (at the acts 310, 312), the digital biometric virtual reality system 100 can utilize the server(s) 304 to generate virtual reality content and identify target user responses. Moreover, although the act 322 of FIG. 3B illustrates providing biometric data and types of measures from the virtual reality device 302, the digital biometric virtual reality system 100 can provide the biometric data and types of measures from another source. For example, the digital biometric virtual reality system 100 can collect biometric data from a remote sensor affixed to a separate device and send the biometric data directly from the remote sensor to the server(s) 304 (bypassing the virtual reality device 302). In addition, rather than performing the acts 324-328, 338-340 at the server(s) 304, in one or more embodiments, the digital biometric virtual reality system 100 utilizes the virtual reality device 302 to perform one or more of these acts.

Furthermore, the method described in relation to FIGS. 3A-3B is intended to be illustrative of one or more example methods in accordance with the present disclosure, and is not intended to limit potential embodiments. Alternative embodiments can include additional, fewer, or different acts than those articulated in FIGS. 3A-3B. For example, as mentioned, in addition to the acts 308-346, the digital biometric virtual reality system 100 can also select virtual reality content by identifying a correspondence between biometric data and user actions. For example, the digital biometric virtual reality system 100 can monitor biometric data and user actions and determine that one or more users are more likely to take certain actions (e.g., purchase a product) when generating certain patterns of biometric data. The digital biometric virtual reality system 100 can detect the patterns of biometric data and select virtual reality content to elicit a target user action.

Additionally, the acts described herein may be performed in a different order, may be repeated or performed in parallel with one another, or may be performed in parallel with different instances of the same or similar acts. For example, although FIG. 3A illustrates determining baseline biometric characteristics (at the act 324) a single time, in one or more embodiments, the digital biometric virtual reality system 100 repeatedly determines and updates a user's baseline biometric characteristics. For example, the digital biometric virtual reality system 100 can monitor a user's temperature as a user utilizes the virtual reality device 302 (e.g., over a number of days or months) and update the user's basal temperature as the basal temperature changes.

Moreover, in one or more embodiments, the digital biometric virtual reality system 100 utilizes stimulus categories as an initial aid to select virtual reality content, but then utilizes biometric data specific to the user rather than (or in addition to) stimulus categories. For example, after collecting a sufficient amount of biometric data, the digital biometric virtual reality system 100 can utilize biometric data trends corresponding to a particular user to generate biometric response thresholds specific to the user. Thus, the digital biometric virtual reality system 100 can determine biometric response thresholds specific to a particular user by analyzing historical biometric data of the particular user in addition to (or rather than) stimulus categories.

Figure 4:
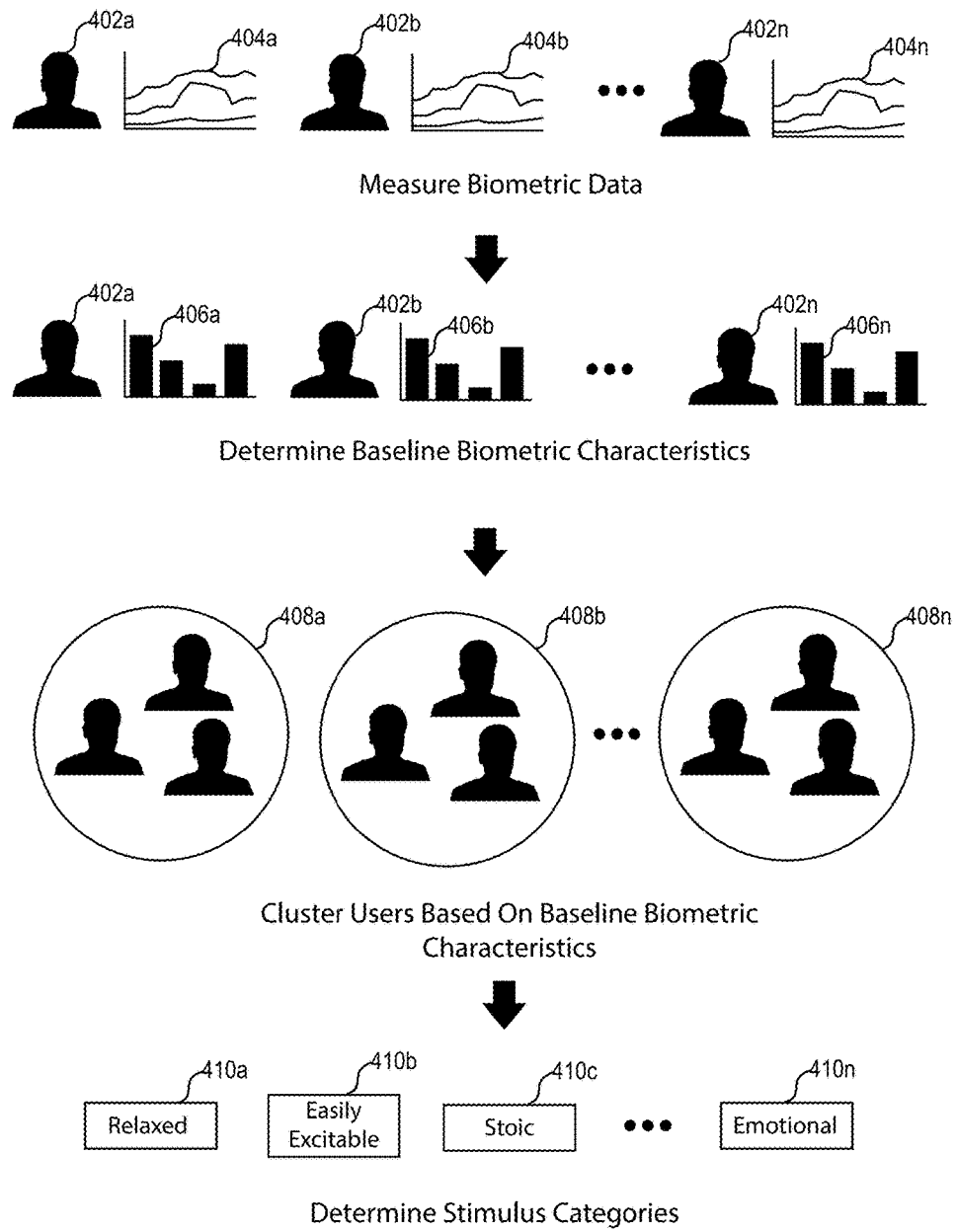
FIG. 4 illustrates a representation of determining stimulus categories based on baseline biometric data in accordance with one or more embodiments.

Turning now to FIG. 4, additional detail will be provided regarding determining stimulus categories in accordance with one or more embodiments. Specifically, FIG. 4 illustrates a plurality of users 402a-402n corresponding to a plurality of virtual reality devices. As shown, the digital biometric virtual reality system 100 measures biometric data 404a-404n corresponding to each of the plurality of users 402a-402n and utilizes the biometric data to generate stimulus categories 410a-410n.

The digital biometric virtual reality system 100 can measure the biometric data 404a-404n in a variety of ways. In one or more embodiments, the digital biometric virtual reality system 100 continuously monitors biometric data for the plurality of users 402a-402n. In other embodiments, the digital biometric virtual reality system 100 monitors biometric data for the plurality of users 402a-402n at particular times (e.g., for the first five minutes that a user utilizes a virtual reality devices).

In other embodiments, the digital biometric virtual reality system 100 monitors biometric data while a virtual reality device provides certain virtual reality content. For instance, as mentioned above, the digital biometric virtual reality system 100 can monitor biometric data while providing standardized virtual reality content via a virtual reality device. Specifically, the digital biometric virtual reality system 100 can generate and provide standardized virtual reality content for measuring certain biometric data. For example, the digital biometric virtual reality system 100 can generate very calm standardized virtual reality content to measure biometric data when a user is calm. The digital biometric virtual reality system 100 can generate intense standardized virtual reality content to measure biometric data when a user is calm. The digital biometric virtual reality system 100 can provide the standardized virtual reality content to each of the plurality of users 402a-402n and measure the biometric data while providing the standardized virtual reality content.

As shown in FIG. 4, based on the measured biometric data, the digital biometric virtual reality system 100 also determines baseline biometric characteristics of the plurality of users 402a-402n. For instance, the digital biometric virtual reality system 100 can analyze the biometric data 404a-404n to identify the baseline biometric characteristics 406a-406n. For example, the digital biometric virtual reality system 100 can analyze heart rates from the biometric data 404a-404n and determine a resting heart rate (e.g., the lowest consistent heart rate from the biometric data measured while showing calm virtual reality content). Similarly, the digital biometric virtual reality system 100 can analyze heart rates from the biometric data 404a-404n and determine an excited heart rate (e.g., a maximum heart rate from the biometric data 404a-404n measured while showing intense virtual reality content).

The digital biometric virtual reality system 100 can analyze the biometric data 404a-404n to determine a variety of baseline biometric characteristics. For example, the baseline biometric characteristics 406a-406n can include: resting heart rate, excited heart rate, difference between resting heart rate and excited heart rate, resting blood pressure, excited blood pressure, difference between resting blood pressure and excited blood pressure, basal body temperature, resting body temperature, excited body temperature, difference between basal, resting, and/or excited body temperatures, resting breathing rate, excited breathing rate, difference between resting breathing rate and excited breathing rate, resting perspiration level, excited perspiration levels, difference between resting perspiration level and excited perspiration levels, bored eye movement, resting eye movement, excited eye movement, difference between bored, resting and/or excited eye movement, bored head movement, resting head movement, excited head movement, difference between bored, resting, and/or excited head movement, resting pupil dilation, excited pupil dilation, difference between resting and excited pupil dilation, resting face shape (mouth shape), excited face shape (mouth shape), laughing face shape (mouth shape), difference between resting face shape, excited face shape, and/or laughing face shape, resting brain waives, excited brain waves, or difference between resting brain waves and excited brain waves.

Although the foregoing examples utilizes the term "excited" or "resting" it will be appreciated that the digital biometric virtual reality system 100 can measure baseline biometric characteristics that correspond to a variety of user states. For example, the digital biometric virtual reality system 100 can determine baseline biometric characteristics for sleeping, sad, or happy states (e.g., biometric data when a user is sleeping or viewing sad or happy virtual reality content).

As shown in FIG. 4, the digital biometric virtual reality system 100 can also cluster (i.e., organize, arrange, or group) users based on measured biometric data. In particular, the digital biometric virtual reality system 100 in relation to FIG. 4, the digital biometric virtual reality system 10 generates the clusters 408a-408n based on the baseline biometric characteristics 406a-406n. The digital biometric virtual reality system 100 can generate clusters of users based on all or a subset of the baseline biometric characteristics 406a-406n. For example, the digital biometric virtual reality system 100 can cluster users based on a difference between resting blood pressure and excited blood pressure and/or a difference between resting breathing rate and excited breathing rate.

The digital biometric virtual reality system 100 can utilize a variety of methods to generate the clusters 408a-408n. For instance, in one or more embodiments, the digital biometric virtual reality system 100 utilizes k-means clustering, meanshift clustering, BIRCH, or hierarchical clustering algorithms to generate the clusters 408a-408n. In other embodiments, the digital biometric virtual reality system 100 utilizes supervised learning or machine learning approaches to generate the stimulus categories 410a-410n.

Moreover, as illustrated in FIG. 4, the digital biometric virtual reality system 100 can also utilize the clusters to determine the stimulus categories 410a-410n. The digital biometric virtual reality system 100 can determine the stimulus categories 410a-410n in a variety of ways. In one or more embodiments, for example, the digital biometric virtual reality system 100 utilizes user input to determine stimulus categories from the clusters 408a-408n (e.g., a user can assign verbal labels to the clusters 408a-408n).

In other embodiments, the digital biometric virtual reality system 100 determines biometric data metrics corresponding to each of the clusters 408a-408n and defines the stimulus categories based on the corresponding biometric data metrics. For example, the cluster 408a can include users that share the following common biometric data metrics: difference between resting heart rate and excited heart rate between 30 and 40 beats per minute and difference between resting breathing rate and excited breathing rate between 6 and 8 breaths per minute. The digital biometric virtual reality system 100 can define the stimulus category 410b based on the common biometric data metrics for the cluster 408a.

The digital biometric virtual reality system 100 can also determine the stimulus categories 410a-410n based on information provided by one or more of the plurality of users 402a-402n (e.g., crowd-sourcing). For instance, the digital biometric virtual reality system 100 can provide a questionnaire to the plurality of users 402a-402n, asking the users to describe themselves. To illustrate, the plurality of users 402a-402n can indicate whether they are easily excited, emotional, or relaxed. The digital biometric virtual reality system 100 can determine a correspondence between the indications provided by the plurality of users 402a-402n and the clusters 408a-408n. For example, the digital biometric virtual reality system 100 can determine that a large percentage of users that describe themselves as easily excitable correspond to the cluster 408a. The digital biometric virtual reality system 100 can determine the stimulus category 410b (i.e., "easily excitable") based on the cluster 408a and the information provided by the users.

Moreover, the digital biometric virtual reality system 100 can also determine the stimulus categories 410a-410n based on virtual reality content provided to the plurality of users 402a-402n. For example, the digital biometric virtual reality system 100 can provide known standardized virtual reality content to the plurality of users and determine stimulus categories by comparing the baseline biometric characteristics and the known standardized virtual reality content. To illustrate, users corresponding to the cluster 408b may have a lower excitability score (e.g., weighted combination of heart rate, breathing rate, etc.) when viewing scary content than the other clusters. In response, the digital biometric virtual reality system 100 can determine that the cluster 408b ("stoic") corresponds to the stimulus category 410c.

As described above, the digital biometric virtual reality system 100 can also utilize the stimulus categories 410a-410n to select virtual reality content. For example, the digital biometric virtual reality system 100 can measure biometric data of a new user and determine baseline biometric characteristics of the new user. The digital biometric virtual reality system 100 can then determine that the new user corresponds to a particular stimulus category.

For example, the digital biometric virtual reality system 100 can determine that the baseline biometric characteristics of the new user correspond to the biometric data metrics corresponding to the cluster 408a. To illustrate, the cluster 408a can include users that have a resting breathing rate of 5 to 6 breaths per minute. The digital biometric virtual reality system can determine that the new user has a resting breathing rate of 5 breaths per minute. Accordingly, the digital biometric virtual reality system 100 can determine that the new user corresponds to the stimulus category 410a.

Moreover, the digital biometric virtual reality system 100 can select virtual reality content corresponding to the stimulus category 410a. For example, the digital biometric virtual reality system 100 can select a particular biometric response threshold corresponding to the stimulus category 410a and utilize the biometric response threshold to encourage a particular target user response and/or target user action. Specifically, the digital biometric virtual reality system 100 can select virtual reality content from a virtual reality content repository based on biometric response thresholds particular to specific stimulus categories.

Figure 5:
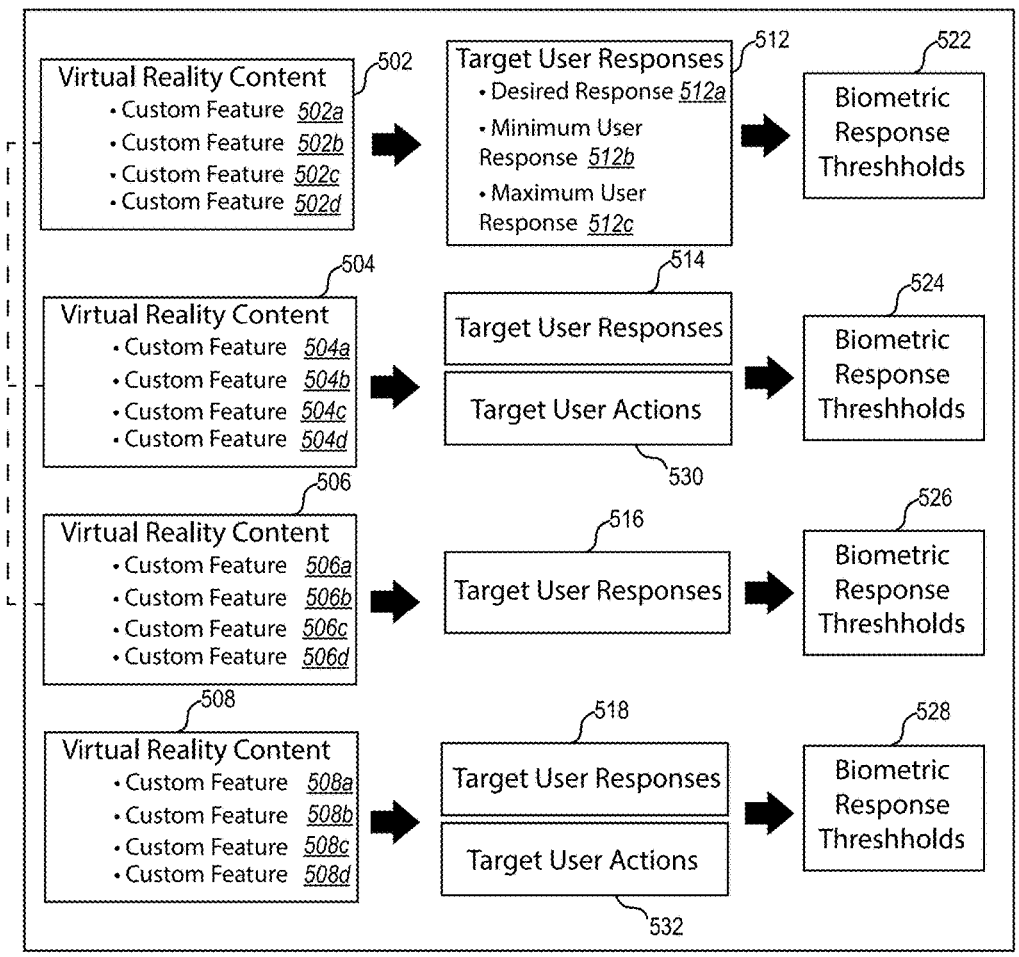
FIG. 5 illustrates a representation of a virtual reality content repository comprising virtual reality content and corresponding target user responses and/or target user actions in accordance with one or more embodiments.

For instance, FIG. 5 illustrates a virtual reality content repository 500. As illustrated, the virtual reality content repository 500 contains a plurality of virtual reality content items 502-508. The virtual reality content items 502-508 can comprise any type of virtual reality content. For example, the virtual reality content item 502 can include a virtual reality video and the virtual reality content item 508 can include a virtual reality video game. As shown, the virtual reality content items 502-508 can include customizable features 502a-502d, 504a-504d, 506a-506d, and 508a-508d, respectively. Customizable features include any features of the virtual reality content 502-508 that can be modified. For example, customizable features include audio features (e.g., volume, beat, tempo, pitch, sound effects, music tracks), visual features (e.g., brightness, vignettes, width or height of field of view, smoothness of jumpiness of presenting content, clarity or blurriness, color) or other features (e.g., a difficulty setting of a video game, a number of characters in a video game, a violence setting).

As illustrated, the digital biometric virtual reality system 100 can also identify relationships between the virtual reality content items 502-508. For example, the virtual reality content items 502, 504, and 506 can represent portions of a virtual reality video (e.g., alternative endings of a virtual reality video). The digital biometric virtual reality system 100 can identify the relationship between the virtual reality content items 502-508, and select the virtual reality content items 502-508 according to the relationship. Thus, the digital biometric virtual reality system 100 can customize virtual reality content by providing the virtual reality content item 502 to a user and then providing new virtual reality content (e.g., the virtual reality content item 504 with an alternate ending). In this manner, the digital biometric virtual reality system 100 can modify any customizable features of any particular virtual reality content item and replace virtual reality content items with new virtual reality content items based on biometric data.

Moreover, as discussed above, the digital biometric virtual reality system 100 can also associate target user responses and/or target user actions with virtual reality content. For instance, FIG. 5 illustrates target user responses 512-518 and target user actions 530, 532. As mentioned above, target user responses can include any desired (or undesired) user response and target user actions can include and desired (or undesired) user action. For example, as shown, the target user responses 512 comprise a minimum response level 512a (e.g., a minimum response to maintain, such as staying awake), a maximum response level 512b (e.g., a maximum response to avoid, such as avoiding over-stimulation or disturbing emotions), and a preferred response level 512c (e.g., a goal response to elicit such as exciting the user). Moreover, each target user response can have various time components (e.g., a target user response of staying awake at all times or a target user response of eliciting an excited response within one minute of presenting a virtual reality game).

As shown in FIG. 5, the digital biometric virtual reality system 100 can also associate target user actions to virtual reality content. As with the target user responses 512, the digital biometric virtual reality system 100 can associate any type of target user action with virtual reality content (and with various time components). For example, the target user actions 530 can include a first target user action (e.g., select a virtual advertisement within the first five minutes of providing the virtual reality content 502) and a second target user action (e.g., avoid a user leaving a virtual reality location at any time during the virtual reality content 502).

Although the target user responses 512 illustrate three individual target user responses 512a-512c, the digital biometric virtual reality system 100 can utilize any number or type of target user response. For example, rather than three target user responses, the digital biometric virtual reality system 100 can utilize one or ten different target user responses. Similarly, although FIG. 5 illustrates target user actions 530, 532, the digital biometric virtual reality system 100 can utilize any number or type of target user action. Moreover, the target user responses and/or target user actions can vary over time. For example, the target user response 518 can include eliciting a startled response within the first five minutes of a virtual reality game. Similarly, the target user response 516 can be to elicit a calm response within one minute of the startled response.

As mentioned above, the digital biometric virtual reality system 100 can also generate biometric response thresholds corresponding to target user responses. For example, FIG. 5 illustrates biometric response thresholds 522-528 corresponding to the target user responses 512-518 and the target user actions 530, 532. The biometric response thresholds 522-528 reflect particular levels of biometric data corresponding to the target user responses 512-518 and the target user actions 530, 532. For example, where the target user responses 516 includes a scared response, the biometric response thresholds 526 can include a threshold heart rate, a threshold breathing rate, a threshold perspiration level, a threshold eye shape, and/or a threshold amount of eye movement that indicate the user has experienced the target user preference (i.e., being scared).

As with the foregoing example, the biometric response thresholds can comprise a plurality of individual thresholds with regard to a variety of individual biometric data measures (e.g., a threshold heart rate and a threshold breathing rate must be met to satisfy the biometric response threshold). Alternatively, the biometric response threshold can comprise a combined score that weights biometric data measures to reflect an overall user response. For example, with regard to a scared target user response, the digital biometric virtual reality system 100 can compute an overall scare score based on heart rate, perspiration level, eye shape, etc. Specifically, the digital biometric virtual reality system 100 can assign various weights to biometric data measures and then set a threshold overall score as the biometric response threshold. Thus, even if a person's eye shape does not change, if the heart rate, breathing rate, and perspiration level rise, the digital biometric virtual reality system 100 can determine that the user has satisfied the biometric response threshold.

In one or more embodiments, the biometric response threshold comprises a score that reflects a variation in biometric data. For example, the biometric response threshold can comprise a score that reflects changes from baseline biometric characteristics. To illustrate, consider a user with a resting baseline biometric characteristic (e.g., resting breathing rate), X, and an excited baseline biometric characteristic (e.g., excited breathing rate), Y. The digital biometric virtual reality system 100 can define a biometric response threshold based on the baseline biometric characteristics. For example, the digital biometric virtual reality system 100 can define a biometric response threshold, T, as a value, c, multiplier of the biometric response characteristics: such as:

$$T=c*Y, \text{ or}$$

$$T=c*X$$

Similarly, the digital biometric virtual reality system 100 can define a biometric response threshold, M, as a value, c, change from the biometric response characteristics, such as:

$$T=c*(Y-X)+X$$

Although the foregoing examples illustrates a linear relationship between the biometric response threshold and baseline biometric characteristics, the digital biometric virtual reality system 100 can also define a baseline biometric threshold based on a quadratic, logarithmic, exponential, or other mathematical relationship.

As mentioned above, in one or more embodiments, the digital biometric virtual reality system 100 generates the biometric response thresholds 522-528 based on biometric data collected from a plurality of users. For example, the digital biometric virtual reality system 100 can provide virtual reality content with known qualities (e.g., boring or exciting) to a plurality of users and gather biometric data while providing the virtual reality content. The digital biometric virtual reality system 100 can determine what biometric data measures correspond to what virtual reality content and what user responses. For example, based on biometric data aggregated from a plurality of users, the digital biometric virtual reality system 100 can determine that a drop in perspiration, breathing rate, and eye movement corresponds to boring virtual reality content (and a bored user response). The digital biometric virtual reality system 100 can then set a biometric response threshold to a bored user response based on this biometric data (e.g., set the biometric response threshold to a level or change in perspiration, breathing rate, and/or eye movement for a bored user response).

The digital biometric virtual reality system 100 can also generate different biometric response thresholds corresponding to different stimulus categories. For example, in relation to FIG. 5, the biometric response thresholds 524 can include a first biometric response threshold for a first stimulus category (e.g., easily excitable users), and a second biometric response threshold for a second stimulus category (e.g., stoic users).

The digital biometric virtual reality system 100 can generate different biometric response thresholds for different stimulus categories based on biometric data from a plurality of users. Indeed, the digital biometric virtual reality system 100 can determine stimulus categories corresponding to a plurality of users and analyze biometric data to determine how the plurality of users corresponding to the stimulus categories respond to different virtual reality content. The digital biometric virtual reality system 100 can then generate different biometric response thresholds based on the biometric data.

To illustrate, the digital biometric virtual reality system 100 can determine that a first set of users correspond to a first stimulus category. The digital biometric virtual reality system can analyze biometric data for the first set of users while the first set of users experienced virtual reality content (e.g., analyze biometric data while the users experience scary visual content and determine a level that their heart rates increase). The digital biometric virtual reality system 100 can generate the biometric response threshold corresponding to the first stimulus category based on the biometric data (e.g., set the biometric response threshold so that it reflects the level that users' heart rates increased).

As mentioned above, the digital biometric virtual reality system 100 operates with regard to a wide variety of devices that incorporate a wide array of biometric sensors. Accordingly, to accommodate the various capabilities of these devices, the digital biometric virtual reality system 100 can also generate different biometric response thresholds corresponding to different biometric response measures. For example, the digital biometric virtual reality system 100 can generate biometric response thresholds that include a small number of biometric data measurements (e.g., heart rate and head movement). Moreover, the digital biometric virtual reality system 100 can generate biometric response thresholds that include a large number of biometric data measurements (e.g., breathing rate, eye movement, temperature, and blood pressure). In this manner, the digital biometric virtual reality system 100 can generate a variety of biometric response thresholds that can accommodate a wide array of devices with different biometric data measurement capabilities.

Figure 6:
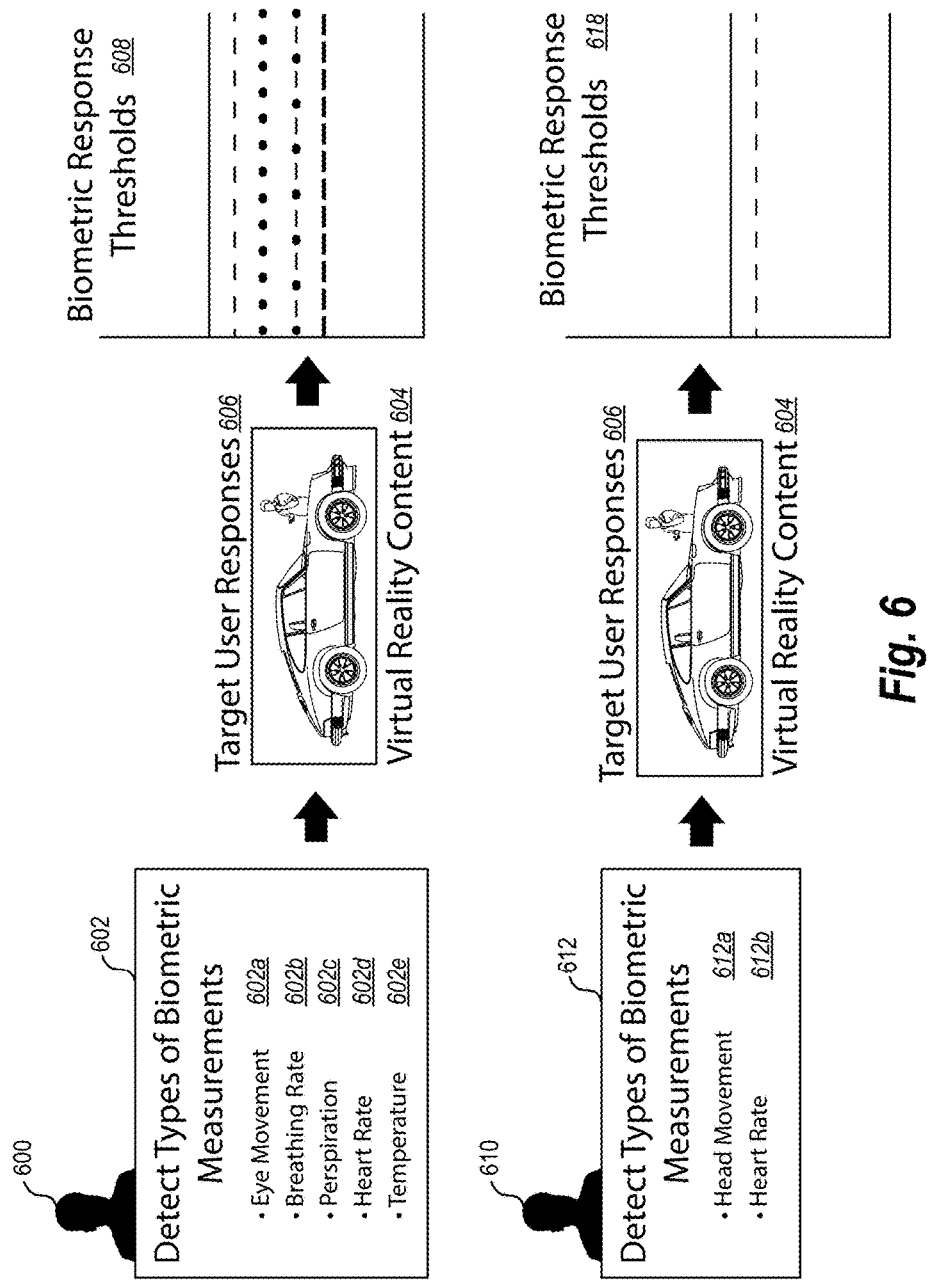
FIG. 6 illustrates a representation of selecting biometric response thresholds in accordance with one or more embodiments.

Accordingly, when a user of a virtual reality device utilizes the digital biometric virtual reality system 100, the digital biometric virtual reality system 100 can select biometric response thresholds corresponding to the types of biometric measurements available at the time. For example, FIG. 6 illustrates selecting biometric response thresholds for two different users 600, 610 based on different types of biometric measurements. For the first user 600, the digital biometric virtual reality system detects types of biometric measurements 602, including eye movement 602a, breathing rate 602b, perspiration 602c, heart rate 602d, and temperature 602e. The digital biometric virtual reality system 100 then identifies virtual reality content 604 and a corresponding target user response 606 to provide to the user 600. For example, the digital biometric virtual reality system 100 can identify a virtual reality advertisement and a target user response (e.g., excited). The digital biometric virtual reality system 100 can then select the biometric response thresholds 608 corresponding to the target user response 606 based on the types of biometric measurements 602 (e.g., a biometric response threshold reflecting eye movement, perspiration, temperature and/or heart rate).

As shown, for the second user 610, the digital biometric virtual reality system 100 detects types of biometric measurements 612 that include head movement 612a and heart rate 612b. The digital biometric virtual reality system 100 determines the virtual reality content 604 and target user response 606. The digital biometric virtual reality system 100 then selects the biometric response thresholds 618 corresponding to the types of biometric measurements 612 (e.g., a biometric response threshold reflecting heart rate and head movement).

As discussed previously, the digital biometric virtual reality system 100 can monitor biometric data while providing virtual reality content and provide modified virtual reality content to elicit a target user response. In particular, the digital biometric virtual reality system 100 can compare biometric data to one or more biometric response thresholds to gauge user response, and provide modified virtual reality content based on the user response.

Figure 7:
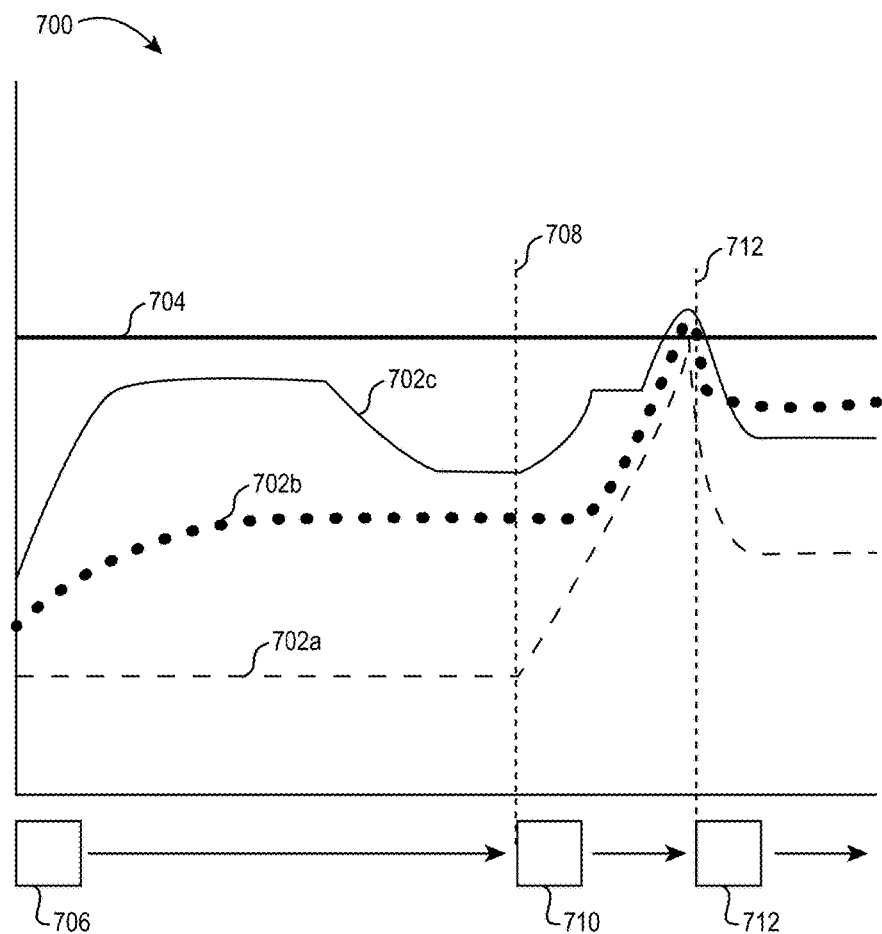
FIG. 7 illustrates a representation of monitoring biometric data while providing virtual reality content and providing modified virtual reality content based on the biometric data in accordance with one or more embodiments.

For example, FIG. 7 illustrates modifying virtual reality content based on biometric data in accordance with one or more embodiments. Specifically, FIG. 7 illustrates a graph 700 reflecting biometric data 702a-702c corresponding to three different biometric data measurements (e.g., heart rate, breathing rate, and perspiration level) over time. The graph 700 also illustrates a biometric response threshold 704. For ease of illustration, the biometric response threshold 704 is represented as a single line and the biometric data measurements 702a-702c are represented as multiple lines, even though, in some embodiments, the biometric response threshold 704 includes different thresholds for different biometric data measures and, in some embodiments, the biometric data measurements 702a-702c is combined into a single score to determine whether the biometric response threshold 704 has been satisfied.

The biometric response threshold 704 corresponds to a target user response. In particular, a content provider seeks to elicit a scared target user response prior to surfacing a virtual reality advertisement. The digital biometric virtual reality system 100 determines a stimulus category corresponding to the user of the virtual reality device (e.g., based on baseline biometric characteristics) and generates the biometric response threshold based on the target user response and the stimulus category.

As illustrated in FIG. 7, the digital biometric virtual reality system 100 provides a first virtual reality content item 706 to the user via a virtual reality device while monitoring the biometric data 702a-702c. Moreover, the digital biometric virtual reality system 100 compares the biometric data 702a-702c with the biometric response threshold 704. As shown, during the time when digital biometric virtual reality system 100 provides the first virtual reality content 706, the biometric data 702a-702c does not satisfy the biometric response threshold (e.g., the measured heart rate, breathing rate, and perspiration rate do not meet the threshold heart rate, breathing rate, and perspiration rate indicating a scared user response). Accordingly, the digital biometric virtual reality system 100 determines a user response (i.e., not scared) and modifies the virtual reality content.

Specifically, at the time 708, the digital biometric virtual reality system 100 modifies the first virtual reality content item 706 to the second virtual reality content item 710. Specifically, the digital biometric virtual reality system 100 modifies the first virtual reality content item 706 based on the determined user response (e.g., not scared) to elicit the target user response (e.g., scared). The modification from the first virtual reality content item 706 to the second virtual reality content item 710 can include any modification discussed herein. For example, the digital biometric virtual reality system 100 can lower the lighting or brightness, change the volume, increase the tempo, increase the number of frightening images or characters, or decrease the smoothness of the first virtual reality content item 706 to generate the second virtual reality content item 710.

For example, where the first virtual reality content 706 comprises a virtual reality video, the digital biometric virtual reality system 100 can splice to a second virtual reality video that includes more intense content. Indeed, as discussed above, the digital biometric virtual reality system 100 can determine a relationship between two virtual reality videos (e.g., alternative storylines to the same story that can be replaced at certain points in time). The digital biometric virtual reality system 100 can replace a first virtual reality video with a second virtual reality video based on the determined relationship. Thus, to illustrate, the digital biometric virtual reality system 100 can replace a first virtual reality video having a first ending with a second virtual reality video with a second (more frightening) ending to the same storyline.

As shown in FIG. 7, the digital biometric virtual reality system 100 can continue monitoring biometric data while providing the second virtual reality content item 710. Moreover, the digital biometric virtual reality system 100 can determine a user response by comparing the biometric data 702a-702c with the biometric response threshold 704. For example, at the time 712, the digital biometric virtual reality system 100 compares the biometric data 702a-702c and the biometric response threshold 704 and determines that the user is scared (i.e., that the user has experienced the target user response). In particular, the digital biometric virtual reality system 100 can determine that the user is scared because the biometric data 702a-702c satisfies the biometric response threshold 704.

Moreover, as shown in FIG. 7, the digital biometric virtual reality system 100 can modify the second virtual reality content item 710 based on the user response. For example, the digital biometric virtual reality system 100 can surface an advertisement (e.g., a pop-up in the virtual reality content or a virtual reality avatar that discusses a product) based on the determination that the biometric data 702a-702c has satisfied the biometric response threshold corresponding to the target user response. Additionally or alternatively, the digital biometric virtual reality system 100 can modify the virtual reality content based on another target user response (e.g., to calm the user after being frightened) and corresponding biometric response threshold.

Although FIG. 7 illustrates modifying virtual reality content by increasing the intensity to increase excitement (e.g., to scare) a user, the digital biometric virtual reality system 100 can also modify virtual reality content to calm a user. For example, consider a virtual reality advertisement for a relaxing resort destination. video game content provider that wants to elicit an extreme startled response from a user by first ensuring that the user is very calm. The digital biometric virtual reality system 100 can generate a biometric response threshold reflecting a calm user response. Moreover, the digital biometric virtual reality system 100 can monitor biometric data and modify the virtual reality content until the biometric response threshold has been satisfied.

Figure 8:
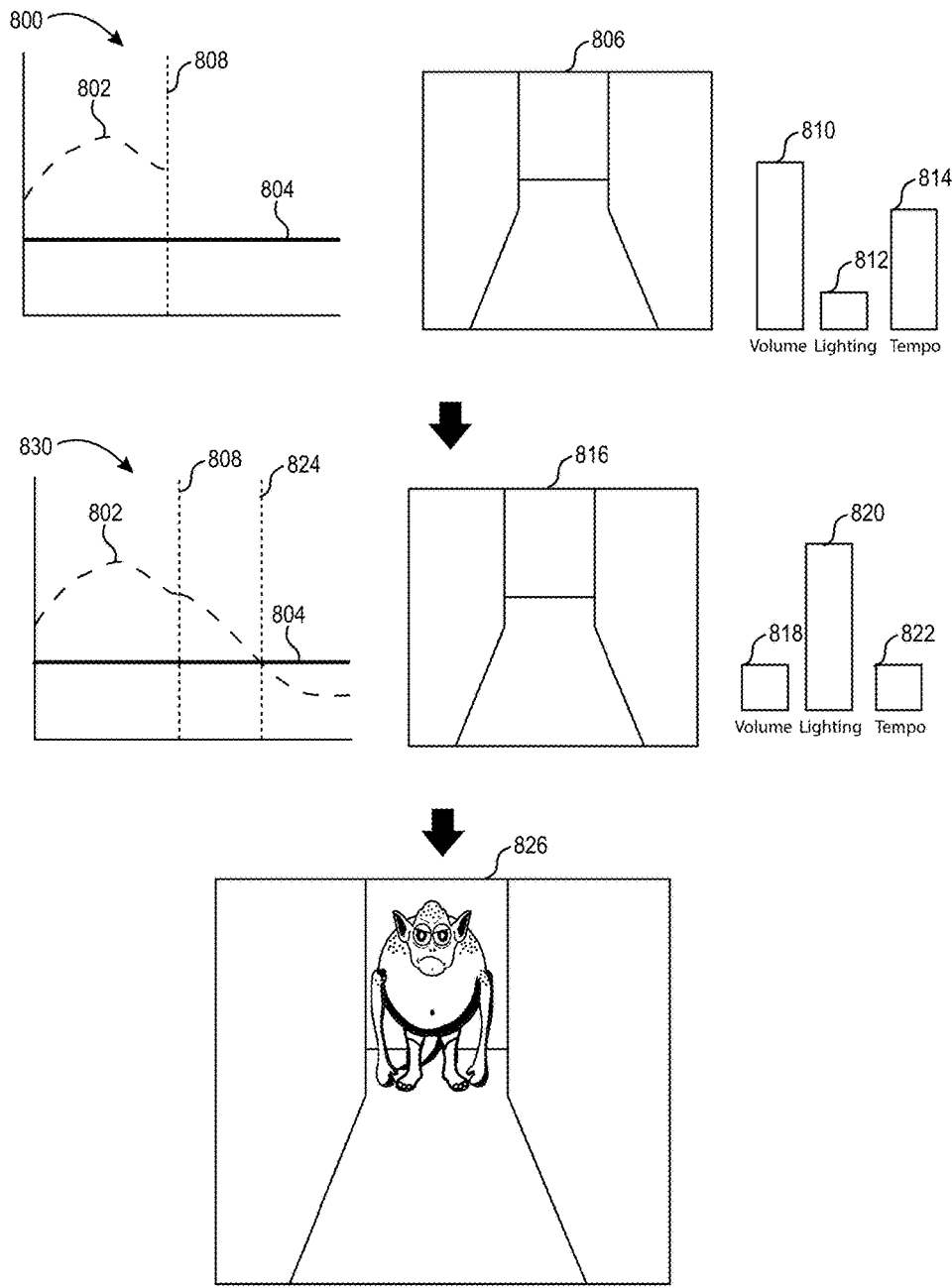
FIG. 8 illustrates a representation of providing modified virtual reality content based on biometric data in accordance with one or more embodiments.

Thus, for example, FIG. 8 illustrates a graph 800. The graph 800 illustrates biometric data 802 over time together with a biometric response threshold 804. As just mentioned, the biometric response threshold 804 corresponds to a calm target user response. Specifically, a content provider seeks to calm a user before providing startling virtual reality content. As discussed above, in one or more embodiments, the digital biometric virtual reality system 100 measures biometric data and satisfaction of a biometric response threshold utilizing a combined biometric data score. The biometric data 802 is a weighted biometric data score reflecting heart rate, breathing rate, and/or other biometric data.

FIG. 8 also illustrates virtual reality content 806 and a time 808. The virtual reality content 806 is a virtual reality game that includes music at a first volume 810 and a first tempo 814, and a virtual environment with a first lighting level 812. At the time 808, the digital biometric virtual reality system 100 compares the biometric data 802 and the biometric response threshold 804 and determines a user response (e.g., not calm or is otherwise anxious). Accordingly, the digital biometric virtual reality system 100 modifies the virtual reality content 806 to elicit a target user response (e.g., to calm the user before providing frightening virtual reality content to increase the effect of startling the user).

In particular, as shown in FIG. 8, the digital biometric virtual reality system 100 provides modified virtual reality content 816. Specifically, the digital biometric virtual reality system 100 reduces the first volume 810 to a second volume 818, increases the first lighting level 812 to a second lighting level 820, and reduces the first tempo 814 to a second tempo 822.

As illustrated in the graph 830, the biometric data 802 falls as a result of the modified virtual reality content 816. In particular, at a time 824, the digital biometric virtual reality system 100 compares the biometric data 802 and the biometric response threshold 804 and determines that the biometric response threshold has been satisfied (i.e., the user has reached the target user response). In response, the digital biometric virtual reality system 100 provides the modified virtual reality content 826 (e.g., as proscribed by the content provider). In particular, the digital biometric virtual reality system 100 provides modified virtual reality content 826 that includes a monster to startle the user after reaching the calm target user response.

Although the foregoing example aims to startle the user after eliciting a calm user response, the digital biometric virtual reality system 100 can modify virtual reality content to increasingly relax and calm a user. For example, the digital biometric virtual reality system 100 can be utilized to modify virtual reality content to induce sleep. Moreover, the digital biometric virtual reality system 100 can be utilized to elicit deeper levels of relaxation and focus.

In one or more embodiments, the digital biometric virtual reality system 100 determines a time (e.g., the time 708 and/or the time 808) for providing modified virtual reality content. For example, in one or more embodiments, the digital biometric virtual reality system 100 utilizes a fixed amount of time to obtain a target user response before modifying virtual reality content (e.g., one minute or five minutes). In other embodiments, the digital biometric virtual reality system 100 selects a time for monitoring visual reality content based on the virtual reality content. For example, the digital biometric virtual reality system 100 can determine that two virtual reality videos can be interchanged at certain points in time. The digital biometric virtual reality system 100 can modify the virtual reality content at the certain points in time to create smooth transitions between virtual reality content.

In other embodiments, instead of modifying virtual reality content at specific, points in time, the digital biometric virtual reality system 100 gradually modifies virtual reality content. For example, the digital biometric virtual reality system 100 can gradually reduce the lighting of a virtual environment, gradually increase the volume, gradually increase the tempo of the music, or otherwise gradually modify the virtual reality content to elicit a target user response.

Moreover, the digital biometric virtual reality system 100 can determine what changes to make to the virtual reality content to elicit a target user response. For example, in one or more embodiments, the digital biometric virtual reality system 100 maintains a database, matrix, or look-up table that correlates target user responses (or changes in biometric data) to modifications in virtual reality content. For example, FIG. 9 illustrates a modification database 900 in accordance with one or more embodiments. As shown, the modification database 900 includes target user responses 902 and corresponding modifications 904.

Although the modification database 900 illustrates target user responses 902 and modifications 904, it will be appreciated based on the disclosure herein, that the modification database 900 can include other factors or attributes that contribute to modifications. For example, the modification database 900 can indicate modifications to apply to achieve particular changes in biometric data (e.g., increase tempo of music to increase heart rate). The modification database 900 can also include other attributes that contribute to expected user response based on modified virtual reality data. For example, the modification database 900 can include contextual attributes that impact user response. To illustrate, the modification database 900 can include contextual attributes that indicate reducing brightness in exciting virtual reality content (e.g., a virtual high-speed car chase) will increase heart rate, while reducing brightness in calming virtual reality content (e.g., in a virtual yoga class) will decrease heart rate.

In one or more embodiments, the digital biometric virtual reality system 100 can actively learn what modifications to apply (e.g., what modifications to apply to elicit target user responses or changes in biometric data). For example, by monitoring biometric data based on modified virtual reality content, the digital biometric virtual reality system 100 can learn that particular modifications result in particular responses (e.g., changes in biometric data). For example, the digital biometric virtual reality system 100 can provide biometric data and corresponding modifications to virtual reality content to a machine learning algorithm. Based on the biometric data and corresponding virtual reality content modifications, the digital biometric virtual reality system 100 can train the machine learning algorithm to predict biometric data changes that will result from particular modifications in virtual reality content. Thus, the modification database 900 can include a trained machine learning algorithm that utilizes various attributes to select modifications to elicit a target user response.

Although many of the foregoing examples discuss biometric response thresholds and modifications to virtual reality content in the context of eliciting a target user response, the digital biometric virtual reality system 100 can similarly elicit a target user action. In particular, the digital biometric virtual reality system 100 can determine a biometric response threshold corresponding to a target user action and provide modified virtual reality content based on the biometric response threshold.

In one or more embodiments, the digital biometric virtual reality system 100 determines biometric response thresholds corresponding to target user actions by analyzing historical biometric data. In particular, the digital biometric virtual reality system 100 can utilize historical biometric data to determine a correspondence between biometric data and particular user actions. Moreover, the digital biometric virtual reality system 100 can then select virtual reality content based on the correspondence between the biometric data and the particular user actions (i.e., a correspondence between biometric data and target user actions).

Figure 10:
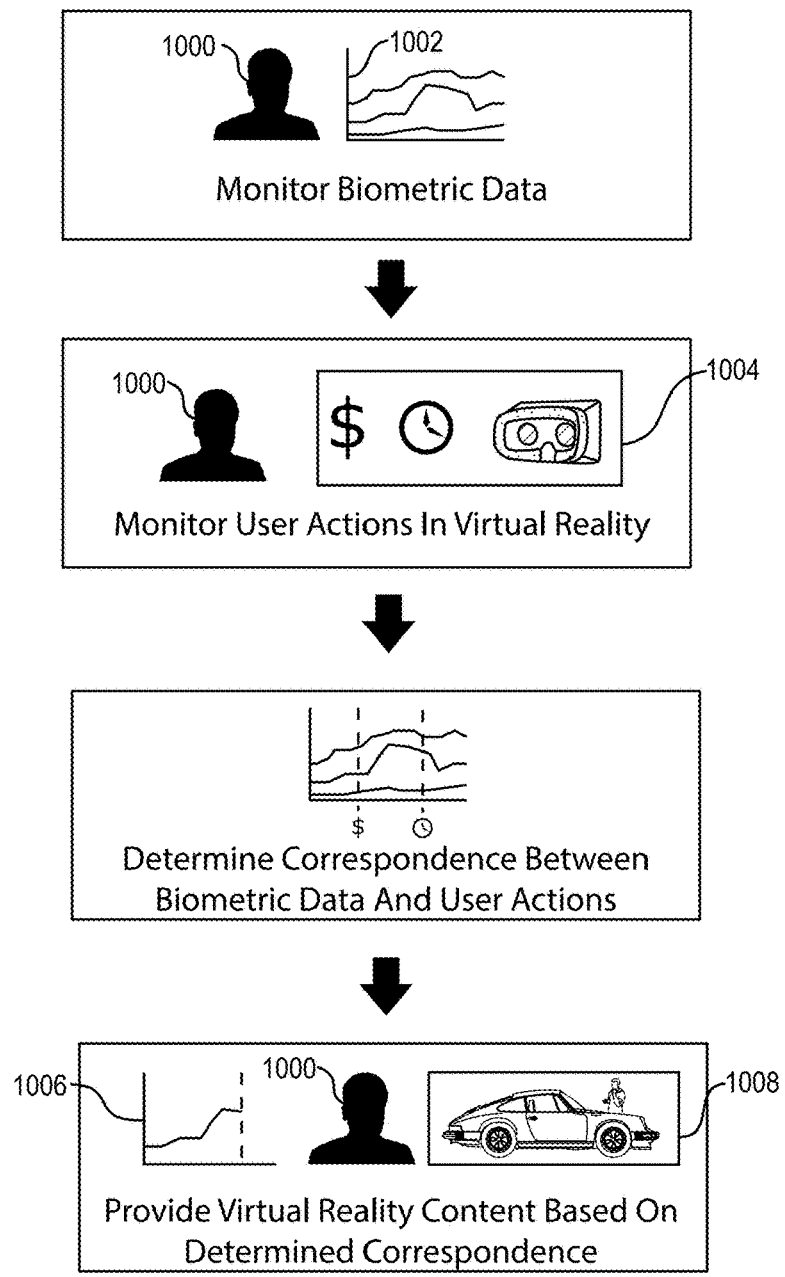
FIG. 10 illustrates a representation of selecting virtual reality content based on a determined correspondence between biometric data and user actions in accordance with one or more embodiments.

For example, FIG. 10 illustrates selecting virtual reality content based on a correspondence between biometric data and particular user actions in accordance with one or more embodiments. In particular, FIG. 10 illustrates a user 1000 and corresponding biometric data 1002. As shown, the digital biometric virtual reality system 100 monitors the biometric data as the user utilizes a virtual reality device.

Moreover, the digital biometric virtual reality system 100 monitors user actions 1004 in virtual reality. In particular, the digital biometric virtual reality system 100 monitors user actions 1004 as the user 1000 utilizes a virtual reality device. For example, the digital biometric virtual reality system 100 can monitor when a user turns on/turns off a virtual reality device, enters or leaves a particular virtual location (e.g., enters a virtual store, enters a virtual site), begins or ends a particular virtual activity (e.g. starts playing a virtual game, starts virtual shopping), makes a purchase (e.g., a purchase in a virtual environment), interacts with a virtual object (e.g., looks at a virtual advertisement for a particular amount of time or interacts with a virtual avatar), or other actions via a virtual environment.

As shown in FIG. 10, the digital biometric virtual reality system 100 can also determine a correspondence between the biometric data and the user actions 1004. For example, the digital biometric virtual reality system 100 can determine that a user engages in a particular action when the user exhibits particular biometric data. To illustrate, the digital biometric virtual reality system 100 can determine that the user 1000 frequently has a high heart rate, fast breathing rate, and high temperature prior to making virtual purchases. Similarly, the digital biometric virtual reality system 100 can determine that the user 1000 frequently has drooping eyes, elevated perspiration levels, and a slow breathing rate before turning off a virtual game.

More specifically, the digital biometric virtual reality system 100 can generate biometric response thresholds based on the determined correspondence between biometric data and user actions. Indeed, continuing the foregoing examples, the digital biometric virtual reality system 100 can generate a biometric response threshold corresponding to a target user action of making a purchase, where the biometric response threshold includes the high heart rate, the fast breathing rate, and the high temperature corresponding to a target user action. Similarly, the digital biometric virtual reality system 100 can generate a biometric response threshold corresponding to a target user action of avoiding a user leaving a game, where the biometric response threshold includes drooping eye shape, the elevated perspiration levels, and the slow breathing rate.

As illustrated in FIG. 10, the digital biometric virtual reality system 100 can then select virtual reality content based on the determined correspondence (e.g., based on the determined biometric response threshold). In particular, the digital biometric virtual reality system 100 can select virtual reality content to encourage or discourage target user actions based on the determined correspondence between the biometric data 1002 and the user actions 1004. For example, the digital biometric virtual reality system 100 can detect biometric data 1006 from the user 1000 indicating that the user's breathing rate is beginning to slow and the user's eyes are beginning to droop. Based on the determination that the user 1000 leaves a virtual game after experiencing drooping eyes and reduced breathing rate (i.e., by comparing the biometric response threshold and the biometric data), the digital biometric virtual reality system 100 can select virtual reality content 1008 to increase the breathing rate and avoid having the user leave.

Similarly, the digital biometric virtual reality system 100 can detect biometric data 1006 from the user indicating that the user has a low heart rate and low breathing rate while walking through a virtual store. Based on the determining that the user 1000 makes purchases when experiencing a high heart rate, fast breathing rate, and high temperature (i.e., by comparing the biometric response threshold and the biometric data), the digital biometric virtual reality system 100 can provide virtual reality content to increase the user's heart rate and breathing rate to encourage a purchase at the virtual store.

Although FIG. 10 illustrates biometric data 1002, 1006 and user actions 1004 corresponding to a single user 1000, the digital biometric virtual reality system 100 can also provide virtual reality content based on biometric data and user actions for a plurality of users. Indeed, the digital biometric virtual reality system 100 can analyze aggregated biometric data and user actions for a plurality of users and determine a correspondence between the biometric data and the user actions.

Moreover, the digital biometric virtual reality system 100 can generate biometric response thresholds based on the determine correspondence between the biometric data and the user actions. For example, the digital biometric virtual reality system 100 can determine that users frequently watch virtual advertisements after a period of rapid head movement and eye movement. The digital biometric virtual reality system 100 can generate a biometric response threshold that includes the period of rapid head movement and eye movement. The digital biometric virtual reality system 100 can then detect the period of rapid head movement and eye movement in a user (i.e., that the biometric data satisfies the biometric response threshold) and, in response, provide a virtual advertisement.

Figure 11:
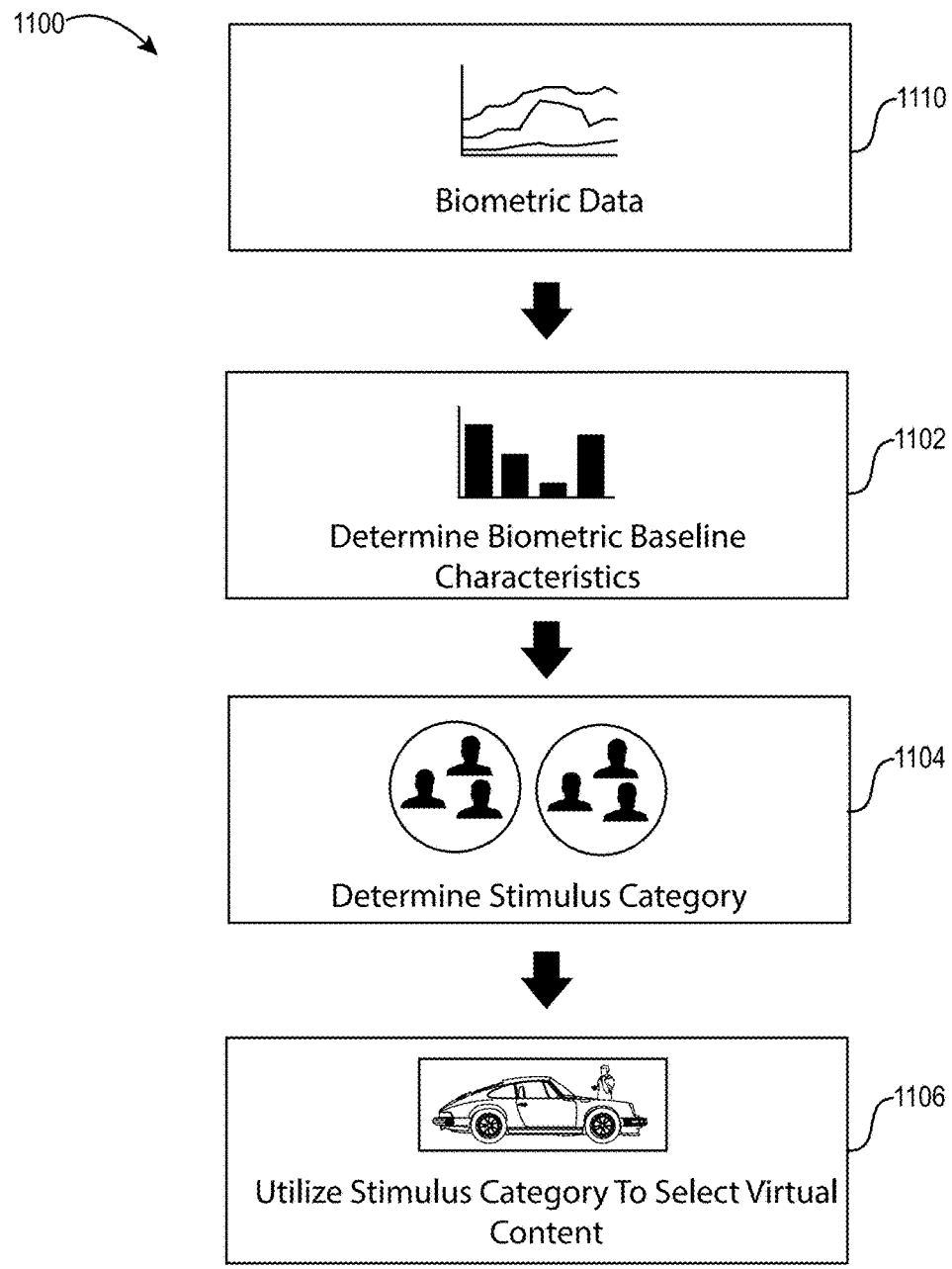
FIG. 11 illustrates a representation of acts in a step for selecting virtual reality content based on biometric data in accordance with one or more embodiments.

Turning now to FIG. 11, additional detail will be provided regarding selecting virtual reality content based on biometric data in accordance with one or more embodiments. In particular, FIG. 11 illustrates a plurality of acts 1102-1106 in a step 1100 for selecting virtual reality content based on biometric data 1110.

In particular, as shown in FIG. 11, the step 1100 includes an act 1102 of determining biometric baseline characteristics. For instance, as described above, the act 1102 can include analyzing the biometric data 1110 to determine baseline biometric characteristics. To illustrate the act 1102 can comprise analyzing heart rate data to determine a resting heart rate.

Moreover, as shown in FIG. 11, the step 1100 includes an act 1104 of determining a stimulus category 1104. For instance, as described above (e.g., in relation to FIG. 4), the act 1104 can include determining a stimulus category based on the biometric baseline characteristics (e.g., the biometric baseline characteristics determined at the act 1102). To illustrate, the act 1104 can include clustering a plurality of users based on biometric data corresponding to the plurality of users and generating a plurality of stimulus categories based on the clusters. The act 1104 can also include determining a stimulus category from the plurality of stimulus categories based on the baseline biometric characteristics (e.g., the baseline biometric characteristics determined at the act 1102).

In addition, as shown in FIG. 11, the step 1100 also includes an act 1106 of utilizing the stimulus category to select virtual reality content. For instance, as described above, the act 1106 can include identifying a biometric response threshold corresponding to the stimulus category and selecting virtual reality content based on the biometric response threshold. For example, the act 1106 can include detecting additional biometric data and comparing the additional biometric data to the biometric response threshold.

Figure 12:
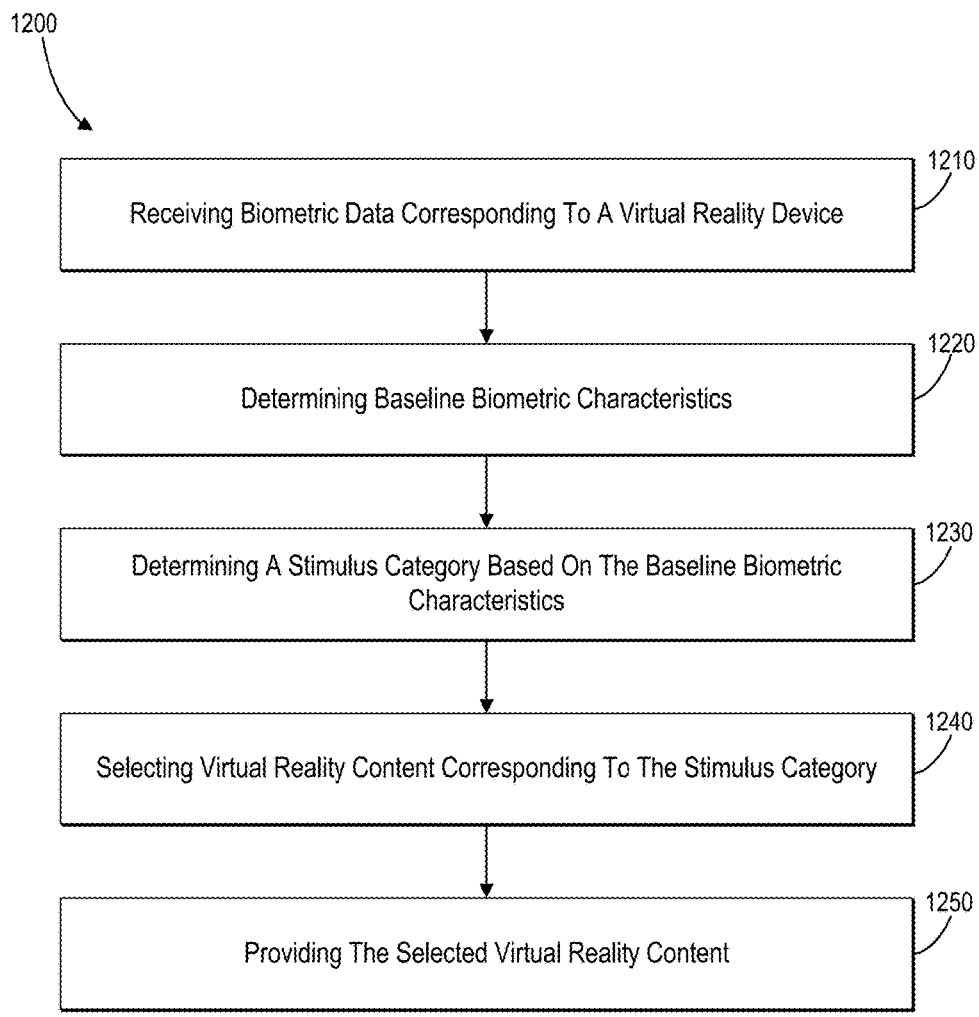
FIG. 12 illustrates a flowchart of a series of acts in a method of customizing virtual reality content based on biometric data in accordance with one or more embodiments.
Figure 13:
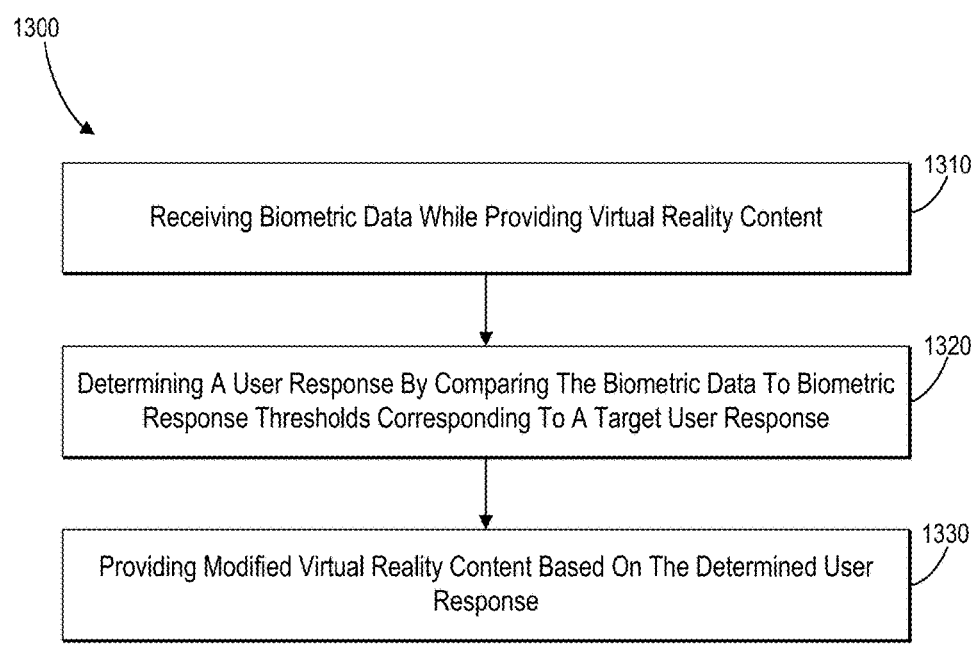
FIG. 13 illustrates another flowchart of a series of acts in a method of customizing virtual reality content based on biometric data in accordance with one or more embodiments.

FIGS. 1-11, the corresponding text, and the examples, provide a number of different systems and devices for providing virtual reality content based on biometric data. In addition to the foregoing, embodiments can also be described in terms of flowcharts comprising acts and steps in a method for accomplishing a particular result. For example, FIGS. 12-13 illustrate flowcharts of exemplary methods in accordance with one or more embodiments. The methods described in relation to FIGS. 12-13 may be performed with less or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart of a series of acts in a method 1200 of selecting virtual reality content based on biometric data in accordance with one or more embodiments. In one or more embodiments, the method 1200 is performed in a digital medium environment that includes the digital biometric virtual reality system 100. The method 1200 is intended to be illustrative of one or more methods in accordance with the present disclosure, and is not intended to limit potential embodiments. Alternative embodiments can include additional, fewer, or different acts than those articulated in FIGS. 12-13.

As illustrated in FIG. 12, the method 1200 includes an act 1210 of receiving biometric data corresponding to a virtual reality device. In particular, the act 1210 can include receiving biometric data corresponding to a user of a virtual reality device. For example, the act 1210 can include receiving at least two of the following: heart rate of the user, breathing rate of the user, perspiration level of the user, head movement of the user, eye movement of the user, temperature of the user, or blood pressure of the user.

As shown in FIG. 12, the method 1200 also includes an act 1220 of determining baseline biometric characteristics. In particular, the act 1220 can include determining baseline biometric characteristics of the user of the virtual reality device based on the biometric data. For example, in one or more embodiments, the act 1220 includes providing standardized virtual reality content to the user via the virtual reality device; and monitoring the biometric data corresponding to the user while providing the standardized virtual reality content.

In addition, as shown in FIG. 12, the method 1200 also includes an act 1230 of determining a stimulus category based on the baseline biometric characteristics. In particular, the act 1230 can include determining a stimulus category for the user of the virtual reality device based on the baseline biometric characteristics. For example, in one or more embodiments, the act 1230 includes comparing the baseline biometric characteristics of the user to biometric data metrics corresponding to different stimulus categories; and determining the stimulus category for the user based on the comparison.

Moreover, in one or more embodiments, the act 1230 includes generating the stimulus categories by determining baseline biometric characteristics for each user of a plurality of users; clustering the plurality of users based on the baseline biometric characteristics for each user; and generating the biometric data metrics corresponding to the different stimulus categories based on the clustered plurality of users Moreover, as illustrated in FIG. 12, the method 1200 also includes an act 1240 of selecting virtual reality content corresponding to the stimulus category. In particular, the act 1240 can include selecting virtual reality content to provide to the user of the virtual reality device corresponding to the stimulus category. For example, the act 1240 can include determining a correspondence between a stimulus category and virtual reality content and selecting the virtual reality content based on the determined correspondence.

As illustrated in FIG. 12, the method 1200 also includes an act 1250 of providing the selected virtual reality content. In particular, the act 1250 can include providing the selected virtual reality content via the virtual reality device.

In one or more embodiments, the method 1200 also includes determining a biometric response threshold utilizing the baseline biometric characteristics of the user; receiving additional biometric data of the user of the virtual reality device while providing the virtual reality content to the user via the virtual reality device; determining a user response to the virtual reality content by comparing the additional biometric data to the biometric response threshold; and providing modified virtual reality content based on the determined user response. For instance, determining the biometric response threshold can include identifying at least one of a target user response or a target user action for the virtual reality content; and determining the biometric response threshold based on the at least one of the target user response or the target user action. Similarly, in one or more embodiments, providing the modified virtual reality content comprises at least one of: modifying audio of the virtual reality content, modifying appearance of the virtual reality content, or providing new virtual reality content.

In addition, the method 1200 can also include determining the user response by determining that the additional biometric data does not satisfy the biometric response threshold. Moreover, providing the modified virtual reality content based on the determined user response can include modifying the virtual reality content based on the determination that the additional biometric data does not satisfy the biometric response threshold. Furthermore, the method 1200 can also include determining a type of biometric measurement corresponding to the biometric data; and selecting the biometric response threshold based on the type of biometric measurement.

FIG. 13 illustrates a flowchart of a series of acts in a method 1300 of providing virtual reality content based on biometric data. As shown, the method 1300 includes an act 1310 of receiving biometric data while providing virtual reality content. In particular, the act 1310 can include receiving biometric data of a user of a virtual reality device while providing virtual reality content from a virtual reality content repository to the user via the virtual reality device. In one or more embodiments, the biometric data comprises at least two of the following: heart rate of the user, breathing rate of the user, perspiration level of the user, head movement of the user, eye movement of the user, temperature of the user, or blood pressure of the user.

Moreover, as shown in FIG. 13, the method 1300 also includes an act 1320 of determining a user response by comparing the biometric data to biometric response thresholds corresponding to a target user response. In particular, the act 1320 can include determining a user response to the virtual reality content by comparing the biometric data of the user to biometric response thresholds corresponding to a target user response. For example, in one or more embodiments, the act 1320 includes determining the user response by determining that the biometric data does not satisfy the biometric response threshold corresponding to the target user response.

As illustrated in FIG. 13, the method 1300 also includes an act 1330 of providing modified virtual reality content based on the determined user response. In particular, the act 1330 can include providing modified virtual reality content from the virtual reality content repository based on the determined user response. For example, in one or more embodiments, the act 1330 includes providing the modified virtual reality content based on the determined user response by modifying the virtual reality content to promote a change in biometric data towards satisfying the biometric response threshold corresponding to the target user response. For example, in one or more embodiments, the act 1330 includes providing the modified virtual reality content by performing at least one of: modifying audio of the virtual reality content, modifying appearance of the virtual reality content, or providing new virtual reality content.

In addition, the method 1300 can also include determining an updated user response by determining that additional biometric data satisfies the biometric response threshold corresponding to the target user response; and providing additional modified virtual reality content based on the determination that the additional biometric data satisfies the biometric response threshold. To illustrate, in one or more embodiments, the virtual reality content repository comprises a plurality of virtual reality digital videos. Moreover, the method 1300 can include providing a first virtual reality digital video from the virtual reality content repository to the user via the virtual reality device; selecting a second virtual reality digital video from the virtual reality content repository based on the determined user response and the target user response; and providing the second virtual reality digital video to the user via the virtual reality device.

The method 1300 can also include receiving initial biometric data corresponding to the user of the virtual reality device; determining baseline biometric characteristics of the user of the virtual reality device based on the initial biometric data; determining a stimulus category for the user of the virtual reality device based on the baseline biometric characteristics; and selecting the modified virtual reality content based on the stimulus category.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
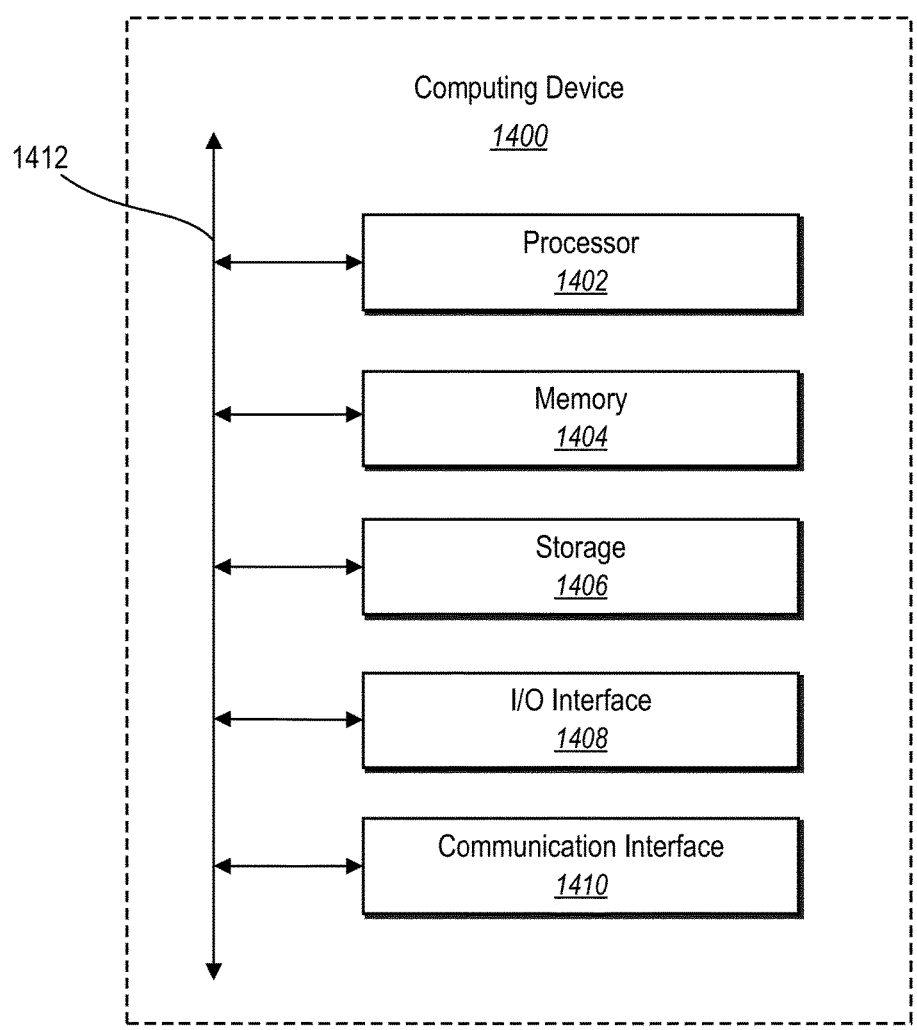
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that the digital biometric virtual reality system 100 can comprise implementations of the computing device 1400. As shown by FIG. 14, the computing device can comprise a processor 1402, memory 1404, a storage device 1406, an I/O interface 1408, and a communication interface 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a stylus or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for providing an immersive virtual reality experience, a computer-implemented method of customizing digital content based on user biometrics, comprising:
   identifying biometric data corresponding to a user of a virtual reality device;
   determining baseline biometric characteristics of the user of the virtual reality device based on the biometric data;
   determining a stimulus category for the user of the virtual reality device from a plurality of stimulus categories based on the baseline biometric characteristics by: clustering a plurality of users based on a plurality of baseline biometric characteristics for the plurality of users, generating biometric data metrics for each of the plurality of stimulus categories based on the clustered plurality of users, and comparing the baseline biometric characteristics of the user to the biometric data metrics corresponding to the plurality of stimulus categories;
   in response to identifying additional biometric data corresponding to the user of the virtual reality device, selecting virtual reality content to provide to the user of the virtual reality device based on the stimulus category and the additional biometric data; and
   providing the selected virtual reality content via the virtual reality device.

2. The method of claim 1, wherein determining the baseline biometric characteristics of the user comprises:
   providing standardized virtual reality content to the user via the virtual reality device; and
   monitoring the biometric data corresponding to the user while providing the standardized virtual reality content.

3. The method of claim 1, further comprising determining the stimulus category for the user based on comparing the baseline biometric characteristics of the user to the biometric data metrics corresponding to the plurality of stimulus categories.

4. The method of claim 3, wherein the biometric data metrics for each of the plurality of stimulus categories based on the clustered plurality of users comprises a range of biometric data metrics.

5. The method of claim 1, further comprising:
   determining a biometric response threshold utilizing the baseline biometric characteristics of the user and the determined stimulus category;
   receiving the additional biometric data of the user of the virtual reality device while providing the virtual reality content to the user via the virtual reality device;
   determining a user response to the virtual reality content by comparing the additional biometric data to the biometric response threshold; and
   providing modified virtual reality content based on the determined user response.

6. The method of claim 5, wherein determining the biometric response threshold comprises:
   identifying at least one of a target user response or a target user action for the virtual reality content; and
   determining the biometric response threshold based on the stimulus category and the at least one of the target user response or the target user action.

7. The method of claim 5, wherein providing the modified virtual reality content comprises at least one of: modifying audio of the virtual reality content, modifying appearance of the virtual reality content, or providing new virtual reality content.

8. The method of claim 5, wherein:
   determining the user response comprises determining that the additional biometric data does not satisfy the biometric response threshold; and
   providing the modified virtual reality content based on the determined user response comprises modifying the virtual reality content based on the determination that the additional biometric data does not satisfy the biometric response threshold.

9. The method of claim 5, further comprising:
   determining a type of biometric measurement available via the biometric data corresponding to the user of the virtual reality device; and
   selecting the biometric response threshold based on the type of biometric measurement available via the biometric data corresponding to the user of the virtual reality device.

10. A system comprising:
    at least one processor; and
    at least one non-transitory computer readable storage medium storing instructions thereon, that, when executed by the at least one processor, cause the system to:
    identify biometric data corresponding to a user of a virtual reality device;
    determine baseline biometric characteristics of the user of the virtual reality device based on the biometric data;
    determine a stimulus category for the user of the virtual reality device from a plurality of stimulus categories based on the baseline biometric characteristics by: clustering a plurality of users based on a plurality of baseline biometric characteristics for the plurality of users, generating biometric data metrics for each the plurality of stimulus categories based on the clustered plurality of users, and comparing the baseline biometric characteristics of the user to the biometric data metrics corresponding to the plurality of stimulus categories;
    in response to identifying additional biometric data corresponding to the user of the virtual reality device, select virtual reality content to provide to the user of the virtual reality device based on the stimulus category and the additional biometric data; and
    provide the selected virtual reality content via the virtual reality device.

11. The system of claim 10, further comprising instructions that, when executed by the at least one computing device, cause the system to determine the baseline biometric characteristics of the user by:
    providing standardized virtual reality content to the user via the virtual reality device; and
    monitoring the biometric data corresponding to the user while providing the standardized virtual reality content.

12. The system of claim 10, wherein the biometric data metrics for each of the plurality of stimulus categories based on the clustered plurality of users comprises a range of biometric data metrics.

13. The system of claim 10, further comprising instructions that, when executed by the at least one computing device, cause the system to:

select an alternative virtual reality video based on the stimulus category for the user.

14. The system of claim 13, further comprising instructions that, when executed by the at least one computing device, cause the system to:
- determine a biometric response threshold utilizing the baseline biometric characteristics of the user and the determined stimulus category;
- receive the additional biometric data of the user of the virtual reality device while providing the virtual reality content to the user via the virtual reality device;
- determine a user response to the virtual reality content by comparing the additional biometric data to the biometric response threshold; and
- provide modified virtual reality content based on the determined user response.

15. The system of claim 10, wherein the biometric data comprises at least two of the following: heart rate of the user, breathing rate of the user, perspiration level of the user, head movement of the user, eye movement of the user, temperature of the user, or blood pressure of the user.

16. The system of claim 13, further comprising instructions that, when executed by the at least one computing device, cause the system to select the alternate virtual reality video from a plurality of alternate virtual reality videos based on the additional biometric data and the stimulus category for the user.

17. In a digital medium environment for providing an immersive virtual reality experience, a computer-implemented method of customizing digital content based on user biometrics, comprising:
- receiving biometric data corresponding to a user of a virtual reality device;
- a step for selecting virtual reality content based on the biometric data; and
- providing the selected virtual reality content via the virtual reality device.

18. The method of claim 17, further comprising:
- receiving a target user response corresponding to the virtual reality content; and
- based on the target user response, determining a biometric response threshold.

19. The method of claim 18, further comprising:
- receiving additional biometric data of the user of the virtual reality device while providing the virtual reality content to the user via the virtual reality device;
- determining a user response to the virtual reality content by comparing the additional biometric data to the biometric response threshold corresponding to the target user response; and
- providing modified virtual reality content based on the determined user response.

20. The method of claim 17, wherein the biometric data comprises at least two of the following: heart rate of the user, breathing rate of the user, perspiration level of the user, head movement of the user, eye movement of the user, temperature of the user, or blood pressure of the user.

* * * * *